CYCLICAL RANDOM ACCESS MAGNETIC DATA STORAGE SYSTEM

Filed Aug. 25, 1965 3 Sheets-Sheet 1

*INVENTOR.*
PERRIN F. SMITH

BY John H. Holcombe
ATTORNEY 3,399,394

CYCLICAL RANDOM ACCESS MAGNETIC DATA STORAGE SYSTEM

Perrin F. Smith, Saratoga, Calif., assignor to International Business Machines Corporation, Armonk, N.Y., a corporation of New York Filed Aug. 25, 1965, Ser. No. 482,365
32 Claims. (Cl. 340—174.1)

ABSTRACT OF THE DISCLOSURE

Method and apparatus for storing data in a large cyclical random access memory. The memory is divided into a number of regions and each region is further divided into many small blocks. Each block includes a block start character, a status character, a chain number, and a data area. The data records to be stored are of variable length and may occupy a number of blocks in a region, terminating with an end of record character. Purging of a record is accomplished by changing the status character of each block having the record from "full" to "empty."

Figure 1:
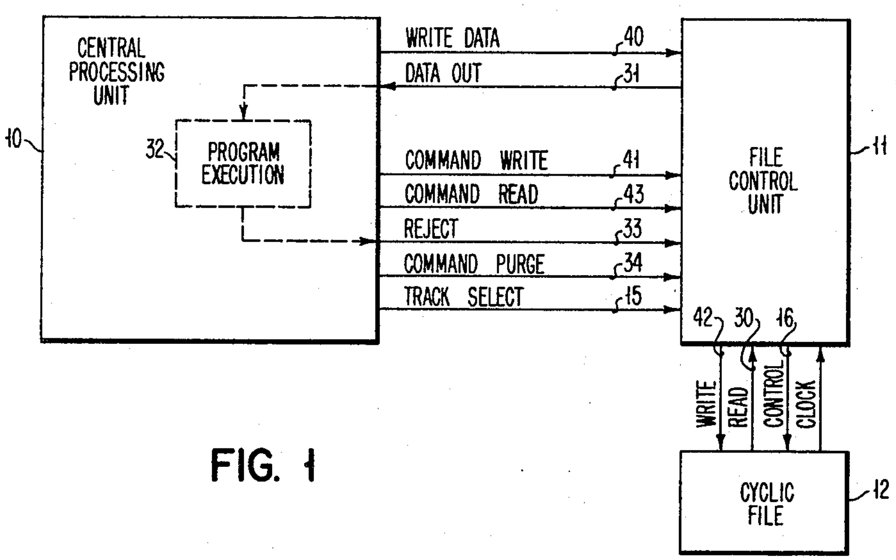

To write a new record, each block after the region start character is counted until the first empty block is encountered. The resultant count number is then made the chain number of the record and is written in the chain number portion of the block. If the new record cannot be fully accommodated in the vacant block, the remainder is written in the succeeding next available blocks until the end of record character is recorded. The chain number is recorded in each of the blocks in which the remainder of the record is recorded, thereby chaining the complete record.

Since the recording of the record is always begun at the first available empty block and continued in the immediately subsequently available blocks, the memory is always packed to the front, conserving recording space.

This invention relates to random access data storage systems, and more particularly, to random access data recording systems for selectively writing, reading or erasing such data wherein direct access can be obtained to individual strings of data, e.g., tracks of magnetically recorded data.

In general, prior art data storage systems rely upon the programmer to select an address for a particular unit of data to write the data into storage, to determine whether the data will overflow the space allotted for a particular record, to determine and select the address or addresses for the overflow portion of the data to be written, to address the random access mechanism to find and read a desired record and to find and read the corresponding overflow data, and to address the random access mechanism to find and erase a selected record and to find and erase the corresponding overflow data. To accomplish this, the address associated with each data record is highly complex, including characters representative of (1) the disk or drum upon which a data record is written, (2) the particular track upon which the record is written, (3) the particular sector of the track upon which the record is written, and (4) the particular record itself.

Thus, the effort required of the programmer to write, read, keep track of, or erase records of data is highly complex and demanding.

The job is made even more complex if a record is erased from a first location, perhaps modified, and written in a new location. This is caused by the fact that an address merely describes the location of a record and bears no other relationship to the data. Thus, the address for the record must be completely redefined and all references to that record by its address correspondingly changed.

In the usual case, the physical length of the data to be stored is not the same in each instance. The above-described complexity involved in record overflow causes most programmers to establish standard record lengths no smaller than the average or medium data length and more often larger than the average or medium data length. Thus, a considerable portion of the available storage space is wasted because less data is recorded than allowed for by the record length.

Some systems attempt to compensate for the variances in data length by utilizing a portion of the memory to establish a format for the remainder of the memory wherein various record lengths are established for each track. Thus, in writing the data the programmer addresses the smallest available storage space long enough to hold the entire length of data to be written. Of course, if the space of the desired size is occupied, the next larger storage space would be addressed. Again, if that space is occupied, a larger space must be addressed, and so on, until an empty space is located. Although this system is somewhat more space efficient than the system having standard record lengths, a great deal of area therefore still remains wasted including that area used to establish the format.

Additionally, the data remains scattered along the track in accordance with the size of each data length thereby requiring an average of one-half a cycle of the memory to begin reading the addressed record and nearly a complete cycle of the memory to read all of the addresses and/or data on a track.

Independently of programming problems, existing systems tend to use memory time inefficiently; i.e., memory time lost during execution of program steps may require an additional memory cycle. For example, if a record is to be purged, a search has to be made to discover the address of the record to be purged. A second memory cycle is then required to execute the purge.

Another system for attempting to compensate for variances in data length is to leave record lengths completely flexible. However, this necessitates setting aside a portion of each record to describe the length of the record and setting aside some storage space to obtain gaps between records. Further, when a data record is purged or erased, the new data record probably will not be of the same length. Thus, either the new data record will have to be inserted at some other point, will not fill the complete vacant space, or will overflow to another address. Therefore, the complexity of operation and programming is increased and, over a period of time, the packing efficiency will only be slightly greater.

Therefore, it is an object of the present invention to provide a method of organizing a cyclical file to eliminate programming complexity in writing or reading desired data.

Another object of the present invention is to provide a data storage system which automatically writes data in the first available record area without direction or control by the programmer thereby continually tending to pack data together.

Another object of the present invention is to provide a method of storing data in cyclical memories which eliminates the need to associate a complex address with each data record.

Still another object of the present invention is to provide a data storage system for automatically writing or reading data without having a complex address written with each data record.

Yet another object of the present invention is to provide a method of organizing a cyclical file which conserves available storage space and substantially reduces wasted storage space.

A further object of the present invention is to provide a data storage system which automatically organizes the stored data to conserve available storage space and substantially reduce wasted storage space.

A still further object of the present invention is to provide a method for purging stored data from a storage means in a single cycle of the memory without actually erasing the data to be purged.

Another object of the present invention is to provide a data storage system accomplishing selective purging of stored data in a single cycle of the memory without actually erasing the data to be purged.

A further object of the present invention is to provide a method of organizing a cyclical file which automatically packs stored data towards the first unit of stored data on a cyclical unit of the file, such as a track.

Yet another object of the present invention is to provide a data storage system for automatically packing the data towards the first unit of data in a cyclical unit of the file, such as a track, so as to reduce the time required to read all of the addresses and/or data on the cyclical unit.

Therefore, in accordance with the present invention there is provided a method of organizing a cyclical file comprisinng the steps of dividing the file into a plurality of regions, further dividing each region into a plurality of blocks of equal length, each block including a chaining number, initially storing records sequentially beginning in the first block in each desired region while recording in the chain number portion of each following block the number of the first block wherein the record is recorded, purging selected records from the file by effectively erasing each block wherein the record to be purged is located, and recording further records in the file beginning in the first available block in the region and sequentially thereafter in subsequent available blocks as needed and recording in the chain number portion of each of the blocks the number of the first block wherein the record is recorded.

Further, in accordance with the present invention, there is provided a data storage system for storing data records comprising a cyclical data storage medium divided into a plurality of regions of selected lengths, each region being divided into a plurality of blocks; means mounted for reading recorded data on the data storage medium; writing means mounted behind the reading means for subsequently writing data on the data storage medium; region detection means for detecting the start of a selected region and resetting and rendering the system effective upon making such detection; gateable buffer means for temporarily storing data records to be written, the output thereof being connected to the writing means; block detection means responsive to the reading means for detecting whether a block is empty; block indication means responsive to the operation of the detection means for storing a chaining character representative of the first detected empty block and for operating the writing means to write that character at the beginning of the first and each subsequently detected empty block; gating means responsive to operation of the detection means for gating the buffer means to thereby supply data to the writing means between the chaining character and the end of the block; and termination means for detecting the end of the data record being written to terminate the operation of the block indication means and gating means.

Figure 2:
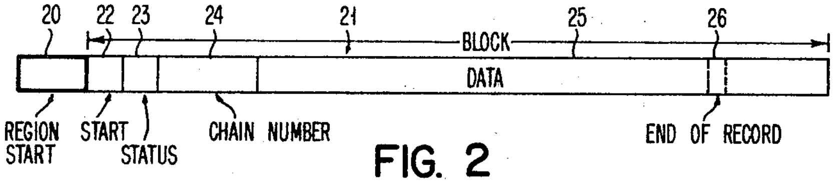
Figure 3A:
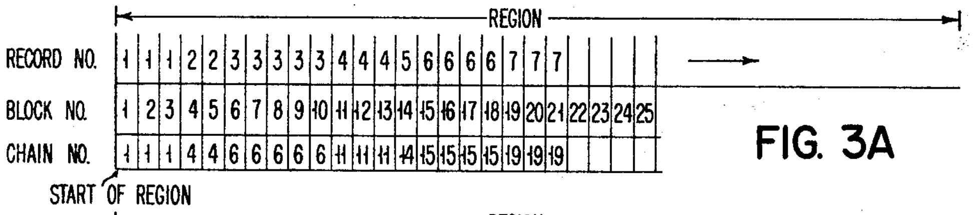
Figure 3B:
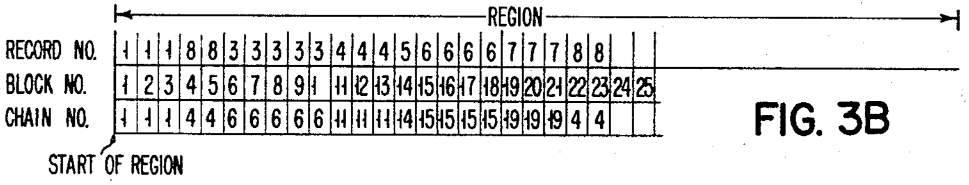
Figure 3C:
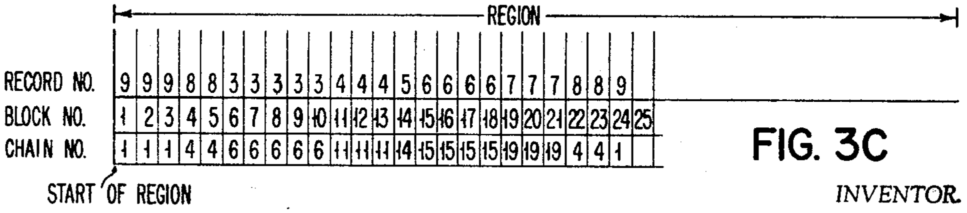
Figure 4A:
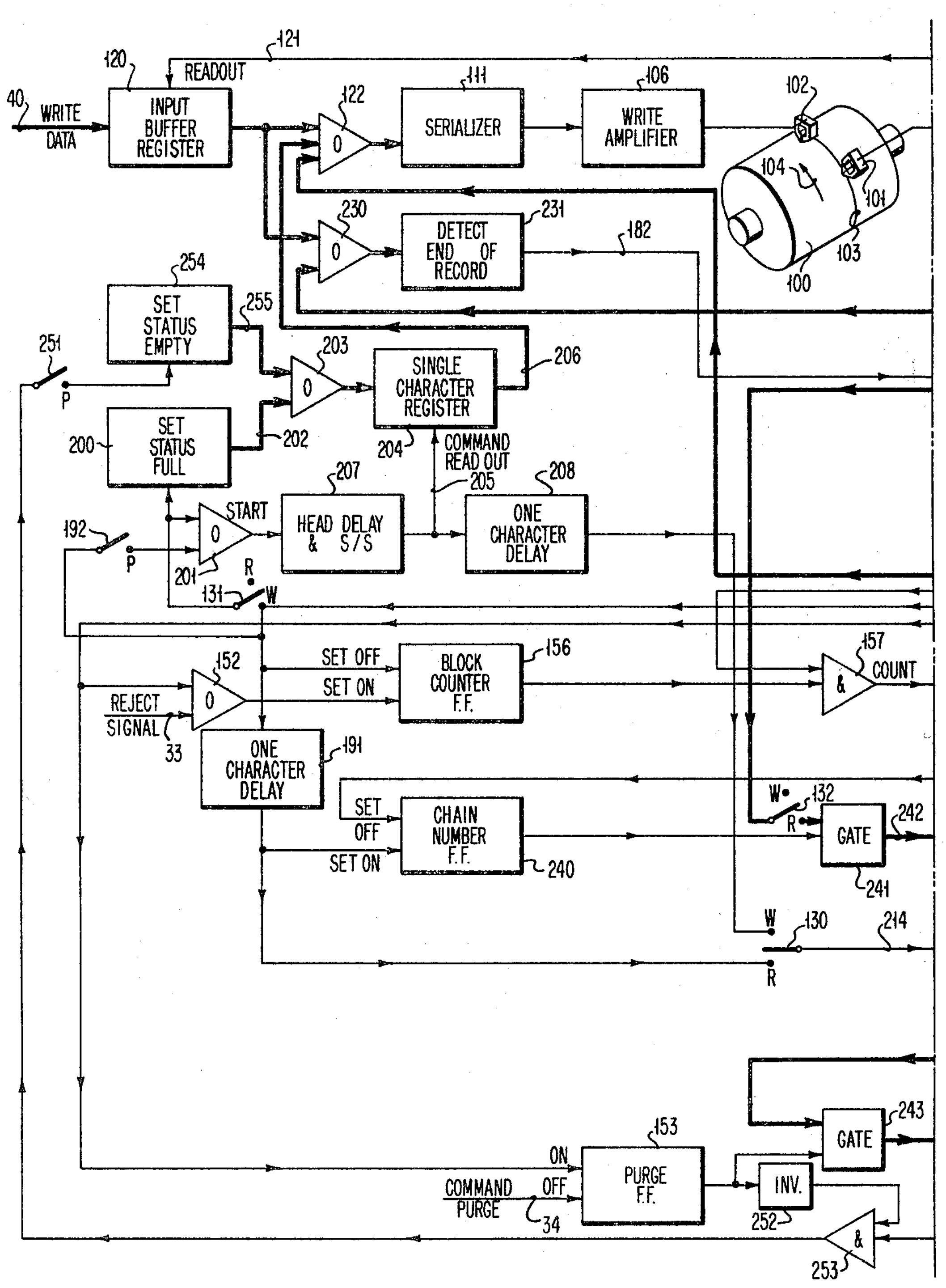
Figure 4B:
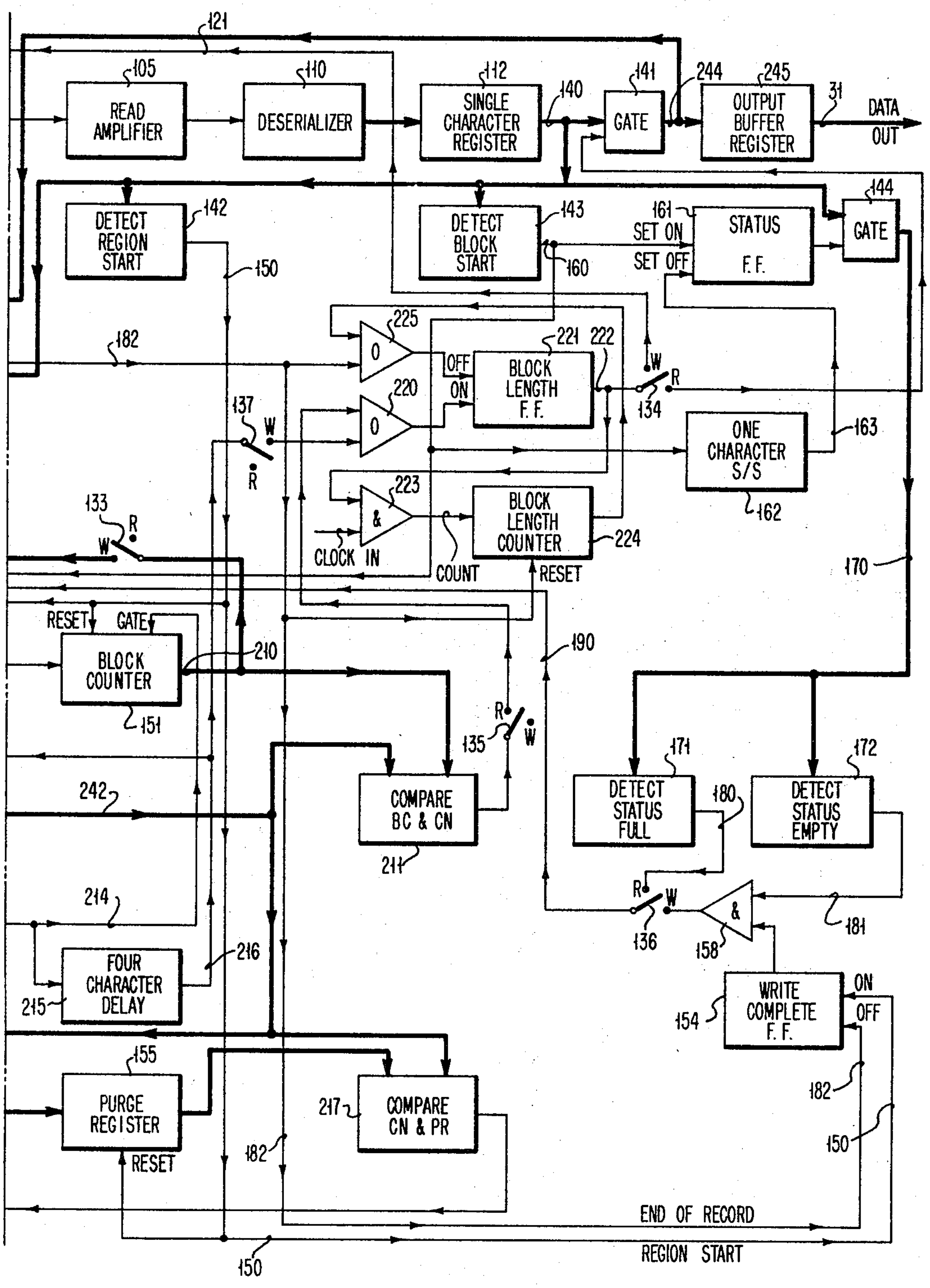

The foregoing and other objects, features and advantages of the invention will be apparent from the following more particular description of a preferred embodiment of the invention, as illustrated in the accompanying drawings, in which:

FIG. 1 is an overall block diagram of the principal components of a data processing system incorporating the invention;

FIG. 2 schematically illustrates a block of data recorded on a cyclic file incorporating the invention;

FIG. 3 schematically illustrates data from various records as distributed in various blocks on the cyclic file in accordance with the present invention; and FIGS. 4A and 4B, when arranged side-by-side, comprise FIG. 4 which schematically illustrates in block diagram form the electrical circuitry for carrying out the present invention.

*Data storage method*

Referring to FIG. 1, a data processing system is shown including, inter alia, a central processing unit 10, a file control unit 11 and a cyclic file 12, each interconnected by means of various cables. The central processing unit is a complete system or a portion of a system that utilizes data from cyclic file 12 and which is capable of cooperating with the file by writing data therein, reading or purging data therefrom, or reading data for the purpose of changing or updating the data and writing it back into the cyclic file.

The cyclic file 12 may be any well-known magnetic drum unit, any well-known magnetic disk unit or any other similar type of cyclic file. The file control unit 11 comprises electronic circuitry for interpreting the commands from the central processing unit and responding by causing cyclic file 12 to perform the desired operation.

For the purpose of illustration, cyclic file 12 is assumed to be a rotating drum unit of any type presently on the market. The drum is preferably divided into a plurality of parallel tracks, each extending circumferentially around the drum.

The drum may be organized into a plurality of regions, each of which may for the purpose of illustration comprise a selected number of tracks along the drum. The CPU selects the desired region by transmitting a set of logical signals on track select cable 15 to the file control unit, which selects the desired track with signals on control line 16.

Referring to FIG. 2, any embodiment of my method of storing data must be dependent, not only upon the method, but also upon the format selected for the data. The format selected may vary from a complete freedom of timing or length considerations, utilizing special control characters to designate the beginning of data, etc., to a very strict position and length format without control characters.

FIG.2 illustrates a format which is somewhat of a compromise to simplify the circuitry involved in the illustrated system.

As shown in FIG. 2, each region is divided into a region start character 20 and a plurality of equal length blocks 21. The region start character 20 is a special character which indicates the beginning of a region. The character is previously recorded, either by conventional recording techniques, or, alternatively, may comprise a permanent recording made of miniature magnetic slugs or other means.

Each block 21 includes a previously recorded start character 22 which indicates the beginning of the block. The start characters are so spaced that each block contains an identical number of bits of data. These start characters may be recorded by normal recording techniques or alternative means in the same manner as region start character 20. Following the start character, there appears a series of normally recorded data bits. The first of this data comprises a status character 23 which, as will be explained hereinafter, comprises a character representing whether the remainder of the block has data therein or is empty. The following characters represent a chain number 24 which will be explained hereinafter. The following bits 25 represent stored data which may or may not include an end of record character 26.

Certain practical observations have been made with respect to the normal type of data that is stored for future reference in practical systems. The first observation is that each usable unit of data in its most convenient form, called a record, is not of identical length; as a matter of fact, considerable variation will normally occur.

The second practical observation is that any convenient gross organization of data relating to the contents thereof will result in an unequal number of records within each division, called a region. For example, in a dictionary with thumb index notches cut at each letter, the number of entries between notches has large variation. In addition, the length of entries varies considerably. A further example is an encyclopedia where entries vary from a few paragraphs to many pages.

If it is desired to prevent the wastage of available storage space, some way must be found to correlate the actual region and record lengths with the expectancy of probable data lengths.

With respect to record lengths, the illustrated system embodying the present method reduces wastage substantially by making the data areas 25 of the data block 21 substantially shorter than the average length of expected data records. For example, the data area is fifty characters in length. Thus, a data record is stored by chaining the number of blocks needed to store all of the data contained in the data record. The chain numbers 24 of the individual blocks making up a particular record are automatically made identical so as to keep track of the blocks on which the record is stored. The last block in the chain is denoted by the appearance in the data area 25 therein of an end of record character 26.

To accommodate the difference in region lengths, another observation concerning data has been made. The observation is that, assuming the total amount of data stored in the storage system remains approximately the same, the amount of data contained in any one region will not vary significantly over a period of time. For example, although people move into and out of a city thereby changing the actual listings in the telephone directory, the proportion of people in the city having names beginning with a particular letter of the alphabet will tend to remain approximately the same.

Therefore, an analysis of the data to be stored is made and the regions selected. The approximate lengths of the regions are then estimated in accordance with the above analysis and the regions located on the cyclic file 12 accordingly. Thus, the region start symbol 20 is recorded at the beginning of each region and the addresses thereof to be selected by the file control unit 11 stored in the file control unit 11 or in a relatively small auxiliary memory for use in programming. As will be seen, the sole addressing to concern the programmer will be that of seeking and finding a particular region, such as a region of surnames beginning with alphabetic character A, which would be called the A region. From that point on, the method and apparatus of the present invention will retrieve or write all data of a particular record automatically without knowledge or concern of the programmer.

In summary, the total memory is divided into a large number of regions, and each region is further divided into blocks 21 having data areas 25 of, for instance, fifty characters. Records to be stored are variable in length and may comprise any number of characters extending to any number of blocks in length. Since the record may extend over a number of blocks, the chain number 24 of each of the individual blocks making up a particular record are identical. Each record terminates in an end of record character 26 and the appearance thereof in the data portion 25 of a block thereby denotes that it is the last block containing the record.

Referring now to FIGS. 3A–C, an example of chaining and the use of the chain number 24 with respect to the subject method is described. Preferably, the system is designed to write in the first block indicated as being empty and subsequent data of a record is recorded and chained in following available blocks. Since an immediately subsequent block may be full and cannot be written over, those blocks must be skipped before writing of data is resumed in empty blocks. Chaining is therefore required to keep track of the blocks containing a particular record.

In FIG. 3A it is assumed that the complete region was empty except for the region start and block start symbols 20 and 22. It is further assumed that seven records are written sequentially into the region. To simplify the example of the invention, one record will be completely written for each complete cycle of the memory. For convenience in keeping track of particular records in explaining the example of FIG. 3, each record is assigned a specific number. In practice, there is no necessity to so designate each record since the chain number automatically keeps track of the record even though it may be distributed throughout a region.

Thus, in FIG. 3A seven records are stored. Record No. 1 is three blocks in length and therefore is stored in block Nos. 1, 2 and 3. Record No. 2 is two blocks in length and is stored in block Nos. 4 and 5, while record No. 3, which is five blocks in length, is stored in block Nos. 6–10, etc. Each record thus continues in sequentially adjacent blocks and chaining is not necessary since no blocks are to be skipped. A complete record may be read by merely continuously reading data until an end of record character is detected.

The method to be utilized in practice normally determines and writes chain numbers even when no blocks are skipped since whether any will be skipped is not known in advance. Thus, record No. 1 begins in block No. 1 and this becomes the chain number for that record. Similarly, record No. 2 begins in block No. 4, so "4" becomes the chain number for that record, etc.

Referring to FIG. 3B, record No. 2 is purged and a new record, No. 8, is stored in the memory.

As will be described with respect to the system, chaining means are provided for counting or keeping track of the individual block numbers until the desired record is located if a record is to be purged or read, or until the first empty block is located if a record is to be written. The number of the first block so located is the chain number for either the record to be purged or read or of the record to be written.

Referring additionally to FIG. 1, to purge record No. 2 in accordance with the subject method, the CPU energizes command purge line 34 and command read line 43. The data from block No. 1 is then read out on cables 30 and 31 to CPU 10 for its program 32 to determine whether the data denotes the desired record. Since the desired record is record No. 2, no comparison is made and the CPU provides an output signal on reject line 33. This causes the system to then read the data from the next block having a chain number and block number which are identical, which is block No. 4. Then, a comparison is made by the program 32 and no reject signal is transmitted on line 33. The lack of a reject signal on line 33 together with a command purge signal of two-character duration on line 34 causes the status character 23 of block No. 4 to be altered from "full" to "empty." Block No. 5 will have the same chain number as block No. 4 and therefore is purged automatically, upon matching the chain number, by altering the status character. The purging is ceased by detection of end of record symbol 26 within the data area 25 of block No. 5.

The new condition present in FIG. 3B is that record No. 2 was merely two blocks in length whereas record No. 8 is four blocks in length. Therefore, record No. 8 cannot be written completely in consecutively adjacent blocks and some blocks must be skipped.

In storing record No. 8, the system detects whether each block is empty or full and when it comes to the first empty block, which in this case is block No. 4, it begins to store the new record. Thus, the first two blocks of record No. 8 are stored in blocks Nos. 4 and 5. The system detects that the following blocks are full so it does not write. The system then looks for the next empty block, which in this case is block No. 22, followed by block No. 23, wherein the two remaining blocks of record No. 8 are then stored. The particular organization shown, therefore, always tends to pack data towards the front, denoted by the region start character 20.

Specifically, on a subsequent cycle of the memory after record No. 2 is purged, record No. 8 is written into storage. This is accomplished by writing data into file control unit 11 on line 40 and energizing the command write line 41. The system will then wait for the arrival of the first block having a status character 23 indicating that the block is "empty." Block Nos. 1, 2 and 3 are indicated as being "full." Block No. 4, however, is now indicated as being "empty." Immediately, the number of that block is written as chain number 24 within the block and the data of record No. 8 is written via write cable 42 in data area 25 of block No. 4.

The writing of the data is stopped at the end of data area 25 and the search continued for another empty block. In this case, block No. 5 is also empty, so that the block number of the first block containing data from record No. 8, which is block No. 4, is written as the chain number of block No. 5. Then, additional data of record No. 8 will be written in data area 25 of block No. 5. Upon reaching the end of data area 25, the search for the next empty block continues. Block Nos. 6–21 will all be indicated as "full," and block No. 22 is the first empty block. Therefore, number 4 is written as the chain number in block No. 22 and additional data from record No. 8 written in data area 25 thereof. Block No. 23 is also empty so chain number 4 will again be written and the remaining data of record No. 8 written therein including end of record character 26. Writing end of record character 26 ceases further operation of the system for seeking empty blocks.

Therefore, the data of record No. 8 has been automatically written in the first available empty blocks thereby packing data to the front and a simple chaining number automatically generated for keeping track of the record.

Still referring to FIGS. 1 and 3B, an example of reading the data of record No. 8 is illustrated. The program 32 of the CPU 10 causes the CPU to select the desired track and to transmit a signal on command read line 43 to file control unit 11. The file control unit responds by causing the data from block No. 1 to be read out on cables 30 and 31 since it is the first block of a record. The CPU receives the data and its program determines whether the desired data is being read. Since the desired record is No. 8, no comparison is made and the CPU provides an output signal on reject line 33. This causes the system to then skip block Nos. 2 and 3 since they are not the first blocks of a record. Block No. 4 is then read and the program indicates that the desired record has been located and no reject signal is transmitted. This establishes block No. 4 as the chain number so that the system automatically reads out the data of block No. 5, skips block Nos. 6–21 and reads the data of block Nos. 22 and 23. The end of record character present in the data area of block No. 23 causes the system to cease transmission of data.

Thus, the CPU merely selects desired data and, once the selection has been made, the system automatically transmits on cable 30 only the data comprising the remainder of the selected record.

FIG. 3C illustrates merely a continuation of the above described method wherein record No. 1 contained in block Nos. 1–3 has been purged therefrom and record No. 9 inserted in block Nos. 1–3 and 24 with chain number 1, which represents the first block in which data from record No. 9 is written.

At any time when data is entered into an empty block, the system automatically rewrites the status character 23 as "full" before writing the chain number or data. Thus, it is seen that no actual erasure of data need occur since the status character 23 alone indicates whether a block is empty or full.

It is therefore seen that the desired method of organizing a cyclical file includes the steps of dividing the file 12 into a plurality of regions, further dividing each region into a plurality of blocks 21, initially storing records sequentially beginning in the first block of the desired region and recording the number of the first block in the chain number position 24 of each following block in which the record is recorded, purging the selected records from the file by selectively erasing each block wherein the record to be purged is located as defined by the chain number, and recording further records in the file beginning in the first available block of the desired region and sequentially thereafter in the subsequent available blocks and again recording the number of the first block wherein the record is recorded in the chain number portion of each of the subsequent blocks.

The above method is not restricted to any particular format. In the example shown, the sequence and lengths of characters and data are fixed. However, as will be explained, they need not be for the above method to operate. Alternatively, additional control characters, such as "chain number follows" wherein the chain number always immediately follows this character, may be used to control operation of a system embodying the subject method.

*File system*

Referring now to FIG. 4, an example of a system for accomplishing the steps of the above method is shown. As an example, the cyclic file shown comprises a drum 100, read head 101, and write head 102. As previously stated, the drum unit may be of any commercially available type. Although the drum unit is shown with only two heads 101 and 102, all presently available units utilize a plurality of heads which either are stationary, thereby requiring one set of heads for each track, or which physically move the heads from position to position to trace out a plurality of tracks. In either case switching is required between the various sets of heads so as to communicate with all of the desired tracks. The schematic diagram shown in FIG. 4 is therefore meant to include any of the schemes and the illustration is merely of a single pair of heads communicating with a selected region which comprises merely a single track 103 as defined by the set of heads 101 and 102.

The drum circulates counter-clockwise, as shown by arrow 104, so that read head 101 reads the data before it appears under write head 102. The distance therebetween must amount to at least one character in length, but less than one block in length. Not all of the presently available drum units are so constructed; therefore, those particular units must be modified slightly to be used with the system as illustrated.

Within the drum unit, read head 101 is connected to a read amplifier 105 and write head 102 is connected to a write amplifier 106. These merely amplify and properly compensate the signals for proper reading or recording.

In FIG. 1, file control unit 11 and cyclic file 12 are shown as separate units. This is in keeping with the recently developed concept of separate file control units. However, the subject invention is equally well adapted to be incorporated in a file control unit contained within the cabinet of a cyclic file 12.

The normal file control unit contains a deserializer 110 which is connected to read amplifier 105 and a serializer 111 which is connected to write amplifier 106. Most of the presently available drum units store data in the serial by bit, serial by character form, whereas most digital computing systems utilize digital data in the parallel by bit, serial by character form. Thus, deserializer 110 accepts a serial string of data from read amplifier 105 and stores the same until sufficient data is received to make up a complete coded character comprising, for example, seven bits. Deserializer 110 then transmits this character on a cable which contains, for example, seven wires. In FIG. 4, all of the heavy lines are such cables and all of the light lines comprise single wires. Serializer 111 does the opposite and converts characters of parallel bits into characters of serial bits.

A single character register 112 is connected to deserializer 110 to receive the parallel data therefrom after a character has been deserialized and then stores the character until the next character has been deserialized. At this time, the register is reset by a clock pulse and the new character read in. The output of the register therefore comprises a single character lasting for one character period (the time required to deserialize a character).

All of the remaining circuitry shown in FIG. 4 is equipment which must be added to the standard file control unit 11 of FIG. 2. The clocking pulses utilized to drive the circuitry of FIG. 4 may be obtained from the standard clock sources for the file control unit.

*Write circuitry*

As described with respect to FIGS. 1–3, the CPU 10 writes data by transmitting the data on cable 40 and by transmitting a command write signal on line 41, both to the file control unit 11. The CPU and its program have nothing more to do with the data to be written; rather, the actual storage of data, including packing the data toward the front, is automatically accomplished by the system of the subject invention.

According to the above method, the system stores the data temporarily, detects whether each block is empty or full, and when it comes to the first empty block, it begins to store the new record. The remainder of the record is then stored in each subsequently available empty block until the end of record is reached which is denoted by end of record character 26. Additional functions include the changing of the status character 23 of each block in which data is entered from "empty" to "full" and the establishment of a chaining number 24 which denotes all blocks containing the particular record.

Referring now to FIG. 4, when the CPU transmits data on cable 40, it is received in an input buffer register 120. The input buffer register is of sufficient capacity to hold the longest record to be transmitted by CPU 10. The register is of the shifting type and the input data is gated such that the first character thereof appears in the first stage of the buffer, the second character in the second stage, etc. When a positive signal appears on READOUT input 121, the register shifts under the control of a clock source synchronized by the drum 100 so as to transmit one character at a time through OR circuit 122 to serializer 111 beginning with the character in the first stage of the buffer register. The transmission to serializer 111 continues so long as a signal appears on READOUT input 121. The clock rate for controlling the shifting of the register is such that serializer 111 is able to serialize the data to write amplifier 106 and write head 102 at the proper bit rate as determined by the rotational speed of drum 100.

The command write signal on line 41 operates a latch circuit (not shown) which in turn operates switches 130–137 to the W or "write" position. The latch remains on until such time as the CPU transmits either a command read or a command purge signal.

As previously stated, the data on track 103 of drum 100 is continually read by read head 101 and read amplifier 105. This data is transmitted to deserializer 110 which converts the data into parallel characters for transmission to single character register 112. The register stores the data representing one character for the duration of a single character time. Meanwhile, during this single character time, the deserializer is converting the subsequent character into parallel form.

The data stored by the register appears on the parallel lines of cable 140 which is connected to gate circuit 141, detect region start circuit 142, detect block start circuit 143, gate circuit 144 and switch 132.

Detect region start circuit 142 detects the region start character when it appears in parallel form on cable 140. This circuit is a standard logic circuit arranged to provide an output only upon the receipt on cable 140 of electrical signals comprising the unique bit combination making up the region start character. This output is provided on line 150 and lasts as long as the region start character remains on cable 140, which is the one character duration of single character register 112.

Line 150 is connected to the RESET input of block counter 151, to OR circuit 152, the SET ON input of purge blocking flip-flop 153, the SET ON input of write complete flip-flop 154, and to the RESET input of purge register 155.

As will be explained hereinafter, the function of block counter 151 is to count the number of blocks detected until the first available empty block is found. The resultant count is then utilized as the chain number. Therefore, it is necessary that the counter be reset to zero at the beginning of the region so that its count of blocks may begin at that point. The appearance of a pulse on line 150 as a result of detecting the region start character accomplishes this resetting of the counter.

A signal appearing on line 150 is transmitted by OR circuit 152 to the SET ON input to block counter flip-flop 156. The block counter flip-flop, as will be explained hereinafter, controls AND circuit 157 to gate block start signals until an empty block is detected. Thus, the block counter will contain the number of the block in which the recording of data is begun.

The basic function of the region start character is therefore to reset the entire system so that it is ready to perform the proper function as commanded by the CPU.

Detect block start circuit 143 is a logic circuit for detecting the block start character and supplying an output signal on line 160 in response hereto. The detect block start circuit is a circuit similar to the detect region start circuit 142 in that it is logically arranged to detect the combination of bits appearing on cable 140 which comprise the block start character. The output of the circuit is a voltage level which lasts for the duration of the appearance of a block start character at the output of single character register 112. The output line 160 is connected to the SET ON input of status flip-flop 161, one character single shot circuit 162 and AND circuit 157.

The format arbitrarily used in FIG. 2 for blocks places the status character immediately after the block start character. Therefore, status flip-flop 161 and one character single shot circuit 162 are arranged to utilize the detection of the block start character to open gate 144 for one character time immediately following the end of the block start signal on line 160.

The SET ON and SET OFF inputs to status flip-flop 161 and the input to one character single shot 162 all include a differentiating network which responds to the negative-going portion of a positive pulse. Thus, since the positive pulse appearing at the output of detect block start circuit 143 is of duration of a single character time as detemined by single character register 112, the SET ON input to status flip-flop 161 and the input to one character single shot 162 are both operated as detect block start circuit 143 turns off.

One character single shot 162 thereby provides a positive output on line 163 for the time duration of the single shot which is set to be slightly longer than one character time. This signal has no effect on status flip-flop 161 since the SET OFF input thereto responds only to the negative-going portion of the signal.

The negative-going portion of the output from detect block start circuit 143 sets on status flip-flop 161 so that it operates gate 144, which remains open, so long as the signal on line 163 remains positive. Slightly more than one character time later, single shot 162 turn off. The negative-going portion of its output signal causes status flip-flop 161 to turn off so as to turn off gate 144, blocking any further characters appearing on cable 140.

At the time gate 144 was opened by status flip-flop 161, single character register 112 concluded transmission of the block start character and received the status character from deserializer 110. This character is stored by the register for one character time during which the character is transmitted on cable 140. Gate 144, having been operated by status flip-flop 161, transmits the status character over cable 170 to detect status full circuit 171 and detect status empty circuit 172. At the conclusion of transmission of the status character, flip-flop 161 closes the gate and blocks transmission of further characters by the gate.

Circuits 171 and 172 are straightforward logic circuits similar to detect region start circuit 142. Circuit 171 responds to the signals appearing on cable 170 comprising the status full character and responds by providing an output on line 180. Circuit 172 similarly detects the arrangement of signals on cable 170 representing the status empty character and responds by providing an output on line 181.

The present system is designed to write a record in the first available empty block and to cease writing after the end of record symbol has been detected. It is probable that, on some occasion, the CPU will write new data into the input buffer register 120 before the previous cycle of the drum has been completed. Therefore, it is necessary to prevent the detection of status empty characters from causing the system to write an incoming new record into storage until a new cycle of the drum has begun, as indicated by a region start character.

The above is accomplished by write complete flip-flop 154 and AND circuit 158. Write complete flip-flop 154 is turned on by the appearance of a pulse line 150 indicating the detection of the region start character by circuit 142. This, in turn, provides one input to AND circuit 158. The flip-flop is turned off by the appearance of a pulse on line 182 which indicates that an end of record character has been detected, as will be explained hereinafter.

Thus, write complete flip-flop 154 is turned on at the beginning of a region so as to provide one input to AND circuit 158 and thereby gate signals from detect status empty circuit 172 appearing on line 181 to switch 136 until an end of record character has been detected. By this means the flip-flop 154 controls the gating of the output of detect status empty circuit 172 such that the detection of status empty characters operates to write additional data only until the end of record character of the record being written has been detected preventing the writing of any additional data.

Switch 136 is in the write position thereby allowing signals gated by AND circuit 158 to appear on line 190. Line 190 is connected to switches 131 and 192, to the SET OFF input of block counter flip-flop 156, and to one character delay 191.

Switch 131 is thrown into the write position transmitting status empty signals to set status full circuit 200 and OR circuit 201.

An object of the system is to skip all blocks indicated as being full and write data in the first available blocks. Therefore, it is necessary to change the status character in each block in which data is written from "empty" to "full." To accomplish this the output of detect status empty circuit 172 is used to operate set status full circuit 200. The set status full circuit comprises a plurality of single shot circuits connected to selected lines of cable 202. The combination of signals on these lines as generated by the single shot circuits comprises the status full character. The single shots are actuated by the appearance of a pulse on line 190 and provide outputs lasting for a sufficient period of time to be transmitted by OR circuit 203 to single character register 204 and to set the register with the status full character.

Single character register 204 comprises a parallel storage register made up of a plurality of flip-flops and also comprising a plurality of AND gates, each associated with the output of a flip-flop. The SET ON inputs to the flip-flops are connected to the wires coming from OR circuit 203. The SET OFF inputs to the flip-flops and the control inputs to the AND gates are both connected to command readout line 205. The SET OFF inputs to the flip-flops include differentiating circuits causing the flip-flops to turn off as a result of the negative-going portion of a positive pulse received from line 205.

Therefore, data appearing at the SET ON inputs to the flip-flops from OR circuit 203 turns on selected ones of the flip-flops. The subsequent pulse appearing on command readout line 205 operates the AND gates to transmit the data from the flip-flops to cable 206. The signals remain on the wires comprising cable 206 until the pulse on line 205 ends turning off the AND gates. The negative-going portion of the pulse on line 205 also operates the SET OFF inputs to the flip-flops thereby resetting the register.

The same pulse that operates set status full circuit 200 is transmitted by OR circuit 201 to head delay and single shot circuit 207. The head delay and single shot circuit 207 comprises two serially arranged single shot circuits. The first single shot has an output which is normally on and the circuit responds to the appearance of a pulse from OR circuit 201 by turning off for a specified time period. This time period is selected to equal the delay time between the appearance of a pulse thereat as a result of reading a status character with read head 101 and the appearance of the beginning of that status character under write head 102, less the time delay due to operation of register 204, serializer 111 and amplifier 106. This time period will be the same for each block recorded on drum 100 and allows the detection of a status character to control the writing of the new status character in the same physical position on the drum. At the end of the time period, the first single shot returns to its normally ON state, thereby operating the second single shot. The second single shot responds to the positive-going portion of the output from the first single shot by providing a positive output pulse one character time in length at its output. This output is transmitted to one character delay circuit 208 and to single character register 204 on command readout line 205.

Therefore head delay and single shot circuit 207 controls single character register 204 to gate the output of the register to serializer 111 for one character time during which time the status character that operated detect status empty circuit 172 is under write head 102 so as to thereby alter the character from "empty" to "full."

As stated previously, block counter flip-flop 156 controls AND circuit 157 to gate block start signals to block counter 151 until an empty block is detected. Thus, the block counter counts the block start signal of every full block and of the first empty block so that it then contains the number of the block in which the recording of data is begun.

Block counter 151 comprises a conventional set of four stacked ring counters, each representing a digital order of magnitude. The output of each stage of each counter is properly coded and connected to the same set of parallel wires by means of OR circuits. Each one of the resultant four sets of lines is connected to a gate circuit and the gate circuits are connected through OR circuits to cable 210. The gating inputs of the gate circuits are connected to various stages of a stepping circuit, which operates at the character rate. The stepping circuit comprises five stages, the first stage being connected to the gate circuits connected to the outputs of the highest ordered counter, etc., and the fifth stage is a rest stage not connected to any lines.

The GATE input to the block counter is connected so as to turn off the rest stage of the stepping circuit and to turn on the first stage. The first stage remains on for one character time and then turns off and turns the second stage on. The stepping continues until the rest stage is turned on. The rest stage then remains on until again activated by pulse on the GATE input to the block counter.

To obtain the proper chain number, therefore, the region start signal appearing on line 150 operates the RESET input to block counter 151 to thereby reset the counter to zero and also appears at the SET ON input of block counter flip-flop 156 to thereby turn the flip-flop on. The output of the flip-flop thus provides one input to AND circuit 157 thereby gating subsequent block start signals appearing on line 160 to the COUNT input of the block counter 151. The counter counts each such pulse so received and retains the cumulative count until again reset.

As previously stated, the negative-going portion of the output of detect block start circuit 143 turns status flip-flop 161 on. The output of this flip-flop is connected to the GATE input to block counter 151. Therefore, immediately upon counting the block start pulse from line 160, the pulse from status flip-flop 161 starts the stepping circuit to transmit the count registered by the counter onto cable 210. The number comprises four sequential characters, each being transmitted for one character time.

The block counter flip-flop 156 remains on and the block counter 151 continues counting so long as each block is full. As the first empty block appears at read head 101, its block start character is detected by circuit 143 and the resultant pulse on line 160 is counted by block counter 151. Subsequently, its status character is detected by detect status empty circuit 172 and a pulse transmitted on line 190 to appear at the SET OFF input to block counter flip-flop 156. This pulse turns the counter off thereby removing one input to AND circuit 157. This prevents any further block start pulses from reaching the COUNT input to block counter 151 until the next region start character is detected. Therefore, block counter 151 retains as its output the number of the first available block having a status character which indicates that the block is empty. This is the number of the first block in which data is written and constitutes the chain number for all following blocks in which data from the particular record is being written.

The output of the block counter is connected to compare block count and chain number circuit 211 and also to switch 133.

The object of obtaining the chain number in block counter 151 is to write the chain number in all blocks in which the particular record is written. Therefore, the predetermined delay of head delay and single shot circuit 207 is utilized to control the writing of the chain number into each block immediately after the status full character is written therein. Thus, the output of head delay and single shot circuit 207 is connected to one character delay circuit 208. The delay circuit comprises any suitable delay means for duplicating at its output a pulse received at its input one character time later. The purpose of this delay is to provide a pulse for writing the chain number one character time after the beginning of writing the status full character.

One character delay circuit 208 is connected through switch 130, which is in the write position, and line 214 to the GATE input of block counter 151 and to four character delay 215. After head delay and single shot circuit 207 provides an output on command readout line 205 to transmit the set status full character to be written in the status position, one character delay 208 delays this pulse for one character time, during which the status character is being written, and transmits the pulse through switch 130 to the GATE input of block counter 151. The pulse then operates the stepping circuit so as to gate the chain number onto cable 210.

Cable 210 is connected to compare block count and chain number circuit 211, to compare chain number and purge register circuit 217, and to switch 133. Switch 133 is set in the write position thereby transmitting the chain number through OR circuit 122 to serializer 111. The serializer serializes each of the four characters sequentially and transmits the serial data to write amplifier 106 which writes the data, via head 102, into the chain number position of the block.

Therefore, the block counter keeps track of the number of block start characters detected until, and including, that of the first detected empty block, and head delay and single shot circuit 207 and one character delay 208 gate the number through serializer 111 and write amplifier 106 to write head 102 so as to write the number in the chain number position of the first available empty block. Block counter flip-flop 156 then blocks AND circuit 157 to prevent the block counter 151 from counting any additional block start characters.

In each additional empty block detected before the detection of the end of record symbol of the data being written, as controlled by write complete flip-flop 154, detect status empty circuit 172 operates head delay and single shot 207 and one character delay 208 to again gate the chain number from block counter 151 to write head 102 so as to thereby write the chain number into each additional block until the record has completely been written into storage.

After generating and writing the chain number into a block, the next step is to write the proper amount of data into the data area of each empty block until the end of record character is detected and written.

As stated above, the output of head delay and single shot 207 and one character delay 208 is transmitted by switch 130 and line 214 to four character delay 215. Four character delay 215 is similar to one character delay 208 and comprises means for accurately delaying a gating signal for four clocked character times.

Delay 215 is connected through switch 137, which is in the W position, and OR circuit 220 to the SET ON input to block length flip-flop 221. The flip-flop is of conventional construction and, when turned on by a pulse from delay 215, produces an output on line 222. This output remains on until the flip-flop is subsequently turned off, as will be explained hereinafter. The output line 222 is connected to one input of AND circuit 223 and to switch 134. Switch 134 is in the write position thereby transmitting the output signal from the flip-flop onto line 121 to the READOUT input of input buffer register 120, thereby causing the register to transmit the data therein through OR circuit 122 to serializer 111.

Thus, for each block in which data is written, the output of one character delay circuit 208 is delayed four additional character times by four character delay 215 during which time the chain number is written into the chain number portion of the block. Then, delay 215 turns on block length flip-flop 221 which operates input buffer register 120 to transmit data to serializer 111. The register is controlled by the character clock of the file control unit so as to transmit one character of data for one character time, then to shift the data therein and transmit a second data character for one character time, etc. Serializer 111 serializes these characters and transmits the serial data through write amplifier 106 to write head 102 where the data is written in the data area of the block.

As stated above, the output of block length flip-flop 221 is connected, via line 222, to one input of AND circuit 223. The other input to the AND circuit comprises the output of the character clock of the file control unit. Thus, while block length flip-flop 221 is on, the character clock pulses are gated through AND circuit 223 to the COUNT input of block length counter 224. The block length counter comprises a conventional binary counter wherein the output is connected to OR circuit 225. The counter is set to count a predetermined number of pulses equivalent to the number of characters in the data area of each block before producing output. The final stage is unstable and provides an output pulse one character time in length and then switches returning the counter to the "0" or "rest" stage of the counter.

Thus, the counter counts the number of characters in the data area of each block and then provides an output signal of one character time duration. This output is transmitted through OR circuit 225 to the OFF input of block length flip-flop 221 thereby turning the flip-flop off. As the flip-flop is turned off, it removes the input to AND circuit 223 thereby blocking further character clock pulses from the block length counter 224. The turning off of the block length flip-flop 221 also removes the signal from the READOUT input to input buffer register 120 thereby stopping further transmission of data to serializer 111.

In this manner, the output of one character delay 208 operates flip-flop 221 to begin transmission of data from input buffer register 120 and simultaneously gates character clock pulses to block length counter 224. The counter counts the number of characters in the data area and then turns off the flip-flop to end the transmission of data to serializer 111.

Detection of the next block start character by detect block start circuit 143 provides a pulse on line 160 which resets the block length counter to zero. The counter is thereby placed in condition to begin counting the next time flip-flop 221 is turned on.

At one point, the end of record character appended to the data being written will be detected. This requires an immediate cessation of writing so that no data from a following record is transmitted until the next revolution of the drum.

The output of the input buffer register is connected through OR circuit 230 to detect end of record circuit 231. Circuit 231 comprises a conventional logic circuit similar to detect region start circuit 142, which is arranged to respond to the data bits comprising the end of record character by providing an output on line 182. This output lasts as long as the end of record character is maintained on either of the input lines to OR circuit 230 which is one character time. Output line 182 is connected to the SET OFF input to write complete flip-flop 154, which operates as previously explained, through OR circuit 225 to the SET OFF input to block length flip-flop 221, and to the RESET input of block length counter 224.

As previously stated, the output of the block length flip-flop controls the character clock input to block length counter 224. Thus, as input buffer register 120 transmits the final character of a record to serializer 111, the character is also transmitted by OR circuit 230 to detect end of record circuit 231. The circuit detects the end of record character and provides an output on line 182, thereby turning off the block length flip-flop 221. This turns off the signal on line 222 which appears at the READOUT input to the input buffer register, thereby terminating the transmission of data by the register.

Since block length flip-flop 221 was turned off, blocking the transmission of further character clock pulses through AND circuit 223, block length counter 224 must be reset without counting to the final stage. Thus, the output of detect end of record circuit 231 is used to operate the RESET input of the counter, resetting the counter to the "0" or "rest" stage.

Block length flip-flop 221 is prevented from turning on for the remainder of the revolution of the drum since the end of record character also turns off write complete flip-flop 154 which blocks status empty pulses from reaching head delay and single shot 207, delays 208 and 215, and flip-flop 221. Upon completion of the revolution, detection of the region start character turns on write complete flip-flop 154 so as to reset the system and again allow pulses to reach block length flip-flop 221.

*Write operation*

Referring to FIG. 3B, the example illustrated is the writing of record No. 8 into the region after record No. 2 has been purged and determining and applying the number 4 as the chain number.

Referring additionally to FIG. 1, the program 32 of the CPU 10 reaches an instruction commanding that record No. 8 be written in the cycle file 12. To accomplish this, the CPU selects the desired region by appropriate signals on track select line 28, which is interpreted by file control unit 11 to select, via control line 29, the desired track. The CPU then transmits a signal on command write line 41 and transmits the data comprising record No. 8 on write data cable 40.

Referring additionally to FIG. 4, the signal on line 41 operates the switching means to throw switches 130–137 to the W, or "write," position. Record No. 8 appearing on cable 40 is read into and stored by input buffer register 120.

Then, nothing of importance happens until the region start character is read by read head 101 and read amplifier 105 and deserialized by deserializer 110. Upon the completion of deserialization, at the end of the character time, the parallel data is transmitted to single character register 112. The register stores the data for one character time during which it transmits the data on line 140. The character is detected by detect region start circuit 142 which thereby transmits a signal on line 150 for the duration of the character time that the character is received from single character register 112.

This signal on line 150 resets block counter 151 to zero, turns write complete flip-flop 154 on, and is transmitted by OR circuit 152 to turn on block counter flip-flop 156. The output of write complete flip-flop 154 activates one input of AND circuit 158 so that subsequent outputs of detect status empty circuit 172 will be gated therethrough. The output of block counter flip-flop 156 provides one input to AND circuit 157 so that the subsequent block start signal will be gated to the COUNT input of block counter 151. Thus, the system is reset and in condition for writing record No. 8 into the first available empty blocks.

The first block to be detected is block No. 1, which already has record No. 1 stored therein. The block start character of block No. 1 is read, deserialized, and stored in single character register 112 for the subsequent character time. The character is detected by detect block start circuit 143 and an output signal transmitted therefrom on line 160. The positive-going portion of the output is received by, although it has no effect upon, status flip-flop 161 or one character single shot 162. The signal on line 160, however, is gated by AND circuit 157, as previously stated, to the COUNT input of block counter 151. The first stage of the lowest order counter is then activated so as to provide the coded signal representative of number 1 to the internal gate circuits.

At the conclusion of the block start signal on line 160, the negative-going portion of the signal turns on status flip-flop 161 and operates one character single shot 162. The output of status flip-flop 161 operates gate 144 to transmit therethrough the following character, which is the status character.

Immediately thereafter the status character is transmitted on cable 140, through gate 144, to detect status full circuit 171 and to detect status empty circuit 172. Since, as shown in FIG. 3B, record No. 1 is already stored in block No. 1, detect status full circuit 171 provides an output while detect status empty circuit 172 does not. Thus, since switch 136 is in the write position, no signal appears on line 190 and no input is applied to the SET OFF input of block counter flip-flop 156.

At the conclusion of the transmission of the status character by single character register 112, one character single shot 162 transmits an output on line 164 thereby turning off status flip-flop 161. This prevents further transmission of characters by gate 144.

In summary, the region start character has reset the system and the block start character of block No. 1 was counted by block counter 151 and the status character has been detected. Since the status character indicated block No. 1 was full, no chain number was established by transmission of the count from the block counter and no data was written into the block.

Since block Nos. 2 and 3 are also full, the system operates similarly for each of the blocks so that block counter 151 counts each one to thereby store the count of three, and no data is written in any of the blocks.

Block No. 4, which has been purged together with block No. 5, now begins to appear under read head 101. Its block start character is read, deserialized and stored in single character register 112 for the subsequent character time. Circuit 143 detects the block start character and provides an output on line 160, which is transmitted by AND circuit 157 to the COUNT input of block counter 151. The counter responds by advancing one step so as to provide the coded signal representative of number 4 to the internal gate circuits.

The negative-going portion of the block start signal on line 160 turns on status flip-flop 161 and operates one character single shot 162. Again, the output of the status flip-flop operates gate 144 to transmit therethrough the immediately following status character. The status character is transmitted via cable 140 and gate 144 to circuits 171 and 172. As shown in FIG. 3B, block No. 4 has been purged; therefore, detect status empty circuit 172 provides an output which is transmitted by AND circuit 158 and switch 136 onto line 190.

The signal on line 190 is transmitted by switch 131 to operate set status full circuit 200, and also transmitted through OR circuit 201 to the input of head delay and single shot 207. Set status full circuit 200 responds by transmitting parallel data representing the status full character via cable 202 and OR circuit 203 to the input to single character register 204, thereby setting the flip-flops within the register to correspond to the status full character. The delay portion of head delay and single shot circuit 207 delays the input thereto the amount of time required for the status character position to begin to appear under write head 102. At this time the single shot is operated and provides a signal to one character delay 208 and via the command readout line 205 to single character register 204. This gates the AND circuits therein to gate the outputs of the flip-flop onto cable 206. This status full character is transmitted by OR circuit 122 to serializer 111, which serializes the character and transmits the data to write amplifier 106 which causes write head 102 to write the character in serial fashion in the status character position. Thus, the status of the block is changed from empty to full.

The negative-going portion of the signal on line 205 then resets the flip-flops of single character register 204 to their off state.

A signal appearing on line 190 also is transmitted to the SET OFF input of block counter flip-flop 156 thereby turning the flip-flop off. This removes the gating input from AND circuit 157 and will block the transmission of any further block start pulses therethrough, thereby preventing further incrementing of block counter 151. Thus, the number 4 is now stored in the counter.

At the end of the transmission of the status character by single character register 112, one character single shot returns to its normally on condition, thereby turning off status flip-flop 161 so as to close gate 144 and prevent the transmission of data to circuits 171 and 172.

Immediately after the status full character has been written into the status area of block No. 4, one character delay circuit 208 provides an output via switch 130 and line 214 to the GATE input of block counter 151 and to four character delay 215. The positive-going portion of the signal at the GATE input to the block counter operates the internal output clock and gating circuits so as to sequentially transmit the parallel characters comprising the chain number via cable 210, switch 133 and OR circuit 122 to serializer 111. The serializer changes the data to serial form and transmits it to write amplifier 106 which writes the data into the chain number area of block No. 4. As previously described, the chain number is the numeral "4" representing block No. 4 which is the first block in which data of record No. 8 is to be written.

Immediately after the chain number has been written, four character delay 215 provides an output via OR circuit 220 to turn on block length flip-flop 221. The output of the flip-flop is supplied to one input of AND circuit 223 and is transmitted via switch 134 to the READOUT input 121 of input buffer register 120. This gates the output of the character clock of the file control unit to the register thereby operating the register such that it transmits one character of data for each character time through OR circuit 122 to serializer 111 which causes the data to be written in the data area of block No. 4.

The character clock is also connected to the second input of AND circuit 223. Since flip-flop 221 is on, the character clock pulses are gated through the AND circuit to the COUNT input of block length counter 224. The counter is incremented by each character clock pulse which represents one character as written in the data area of the block. When the block length counter reaches the count representing the number of characters capable of being stored in the data area, it provides an output to OR circuit 225 for one character time and then automatically resets. This output is transmitted by OR circuit 225 to turn off block length flip-flop 221. This removes the one input to AND circuit 223 preventing the transmission of any further clock pulses to the counter and simultaneously turns off the input buffer register 120 to stop the transmission of data to serializer 111. Thus, the block length counter and block length flip-flop control the amount of data written from the input buffer register into the data area of block No. 4 so that the data written therein corresponds exactly to the space available.

In summary, the system bypasses block Nos. 1, 2 and 3 since they were indicated as being full and the block counter kept track of the number of blocks so detected. Block No. 4 was the first available block so its status was changed from empty to full, its number was stored in block counter 151 as the chain number, the chain number written in the chain number area of block No. 4, and the first portion of data of record No. 8 written into the data area of block No. 4.

The block start character of block No. 5 is detected by circuit 143 and the output therefrom is blocked from block counter 151 by AND circuit 157 because block counter flip-flop 156 remains off. Thus, the counter remains set at number 4.

The negative-going portion of the block start signal operates status flip-flop 161 and one character single shot 162 so as to open gate 144 for one character time period.

The status character is then transmitted through gate 144 to circuits 171 and 172. Since the character indicates that the block is empty, circuit 172 provides an output through AND circuit 158 to set status full circuit 200, OR circuit 201 and block counter flip-flop 156. The signal has no effect on the block counter flip-flop since the counter is already off. As before, the signal received by set status full circuit 200 and OR circuit 201 is utilized by circuit 200, head delay and single shot 207, and single character register 204 to write the status full character into the status area of block No. 5 when it appears under write head 102.

After the status character has been written, one character delay 208 provides an output which operates the GATE input of the block counter so that it provides, as before, the chain number on its cable 210, which is serialized by serializer 111 and written into the chain number area of record No. 5. Thus, the chain number "4" written into the chain number area of record No. 5 is the same as that written into the chain number area of record No. 4.

After the chain number has been written, four character delay 215 provides an output via OR circuit 220 to block length flip-flop 221, which turns on and operates input buffer register 120 to begin transmitting data to be written in the data area of record No. 5. The block length flip-flop also operates AND circuit 223 to gate character clock pulses to the block length counter which again turns off block length flip-flop 221 when the maximum number of characters have been written into record No. 5. This turns off the block length flip-flop which stops the operation of input buffer register 120.

The block start character for record No. 6 is detected by circuit 143 and the output therefrom is again blocked from reaching block counter 151 by AND gate 157 since block counter flip-flop 156 remains off. The negative-going portion of the output of circuit 143 again operates status flip-flop 161 and one character single shot 162 to gate the status character to circuits 171 and 172.

The status character for record No. 6, however, indicates the block is full; therefore, circuit 171 provides an output to the open side of switch 136 and no output is provided by circuit 172. As a result, nothing further happens to the system except that status flip-flop 161 is turned off by one character single shot 162 thereby closing gate 144.

Thus, block No. 6, being full, is skipped over and has no effect on the system. Similarly, since blocks 7–21 are also indicated as being full, they too are skipped over and have no effect on the system.

The block start character pulse for block No. 22 is prevented from reaching block counter 151 due to block counter flip-flop 156 being off and thereby closing AND circuit 157. The character does cause status flip-flop 161 to open gate 144 for the subsequent character time period during which the status character is gated to circuits 171 and 172.

Since block No. 22 is empty, circuit 172 will provide an output on line 190 to operate set status full circuit 200 and the associated circuitry to write a status full character into the status area of block No. 22.

Again, the output of one character delay 208 operates the block counter 151 to transmit data to serializer 111 for writing the chain number in the chain number area of block No. 22. Subsequently, four character delay 215 turns on block length flip-flop 221 so as to control input buffer register 120 to transmit more data of record No. 8 to the data area of block No. 22 until terminated by block length counter 224.

Finally, the block start character of block No. 23 is detected by detect block start circuit 143 which provides an output, the negative-going portion of which operates status flip-flop 161 to open gate 144.

The status character is then transmitted through gate 144 to circuits 171 and 172. Again, the status is empty so that circuit 172 provides an output on line 190. This output operates set status full circuit 200 and the associated circuitry to write the status full character into the status area of block No. 23. Then, one character delay 208 provides an output operating block counter 151 to transmit the chain number "4" to serializer 111 so that it is written in the chain number area of the block. Next, four character delay 215 turns on block length flip-flop 221 so that it operates input buffer register 120, which transmits the remaining data of record No. 8 to serializer 111 to be written in the data area of the block.

However, before block length counter 224 can count the number of characters for the entire data area of the block, the input buffer register transmits the end of record character which indicates the actual end of record No. 8. This character is transmitted to and serialized by serializer 111 and written at the end of the data of record No. 8. The character is also transmitted through OR circuit 230 to detect end of record circuit 231. In response thereto, the circuit provides an output on line 182 which is transmitted through OR circuit 225 to turn off block length flip-flop 221. This immediately terminates the operation of the input buffer register 120 without waiting for block length counter 224 to reach its complete count. The signal on line 182 also resets block length counter 224 to zero. Thus, detection of the end of record character operates to end transmission of data to serializer 111 so that no data from a subsequent record, if stored in the register, is written in a block occupied by another record.

The output of detect end of record circuit 231 is also applied to turn off write complete flip-flop 154 which prevents output signals from detect status empty circuit 172 from being transmitted by AND circuit 158. This prevents further operation of the system until the next region start character is detected.

In summary, the disclosed system has accepted data from the CPU 10 and stored this data in an input buffer register 120. The system then examined the status of each block detected while keeping track of the number of blocks so detected until the first available empty block was indicated by its status character. Then, the count in the block counter after detecting this block remained stored in block counter 151 as the chain number. The system changed the status character in block No. 4 from empty to full, wrote chain No. "4" in the chain number area of the block, and wrote the first portion of data of record No. 8 into the data area of block No. 4. Then, the system detected that block No. 5 was empty and changed its status character from empty to full, wrote the chain number in its chain number area, and wrote more data of record No. 8 in its data area. Blocks 6–21 were all indicated as full so were skipped by the system. Block No. 22 was detected as being empty and its status character changed, the chain number inserted, and more data written therein. Finally, block No. 23 was detected as being empty, its status character changed, the chain number written in the chain number area, and the last of the data of record No. 8 written in the data area thereof, including the end of record character. Upon detection of this end of record character, input buffer register 120 was stopped from transmitting more data and write complete flip-flop 154 turned off to prevent further operation of the system upon detection of status empty characters until a region start character could reset the system.

*Read circuitry*

As described with respect to FIGS. 1–3, the CPU 10 reads data from cyclic file 12 by transmitting an appropriate coded signal over track select cable 15 to select the desired region and then by transmitting a signal on command read line 43 to file control unit 11. The file control unit transmits signals on control line 16 to select the desired track and begin receipt of data from the cyclic file on read cable 30. The file control unit then transmits the data from the data area 25 of the first block of each record to the CPU over line 31. The program 32 of the CPU selects the desired data by continually comparing the incoming data to the designation of desired data. If, as each such block is being read, no comparison is made, the program causes the CPU to supply a signal on reject line 33 to the file control unit. The file control unit will therefore continue transmitting data from the first block of each record to the CPU until a comparison is made and no signal is transmitted on reject line 33. The system then automatically transmits only the data comprising the remainder of the selected record on cable 31 to the CPU.

Referring now to FIG. 4, the command read signal on line 43 operates a latch circuit (not shown) which in turn operates switches 130–137 to the R or "Read" position. The latch remains on until such time as the CPU transmits a command write signal.

As previously stated, the data on track 103 of drum 100 of the cyclic file is continually read by read head 101 and read amplifier 105, and the data is converted into parallel characters by deserializer 110 and transmitted to single character register 112. The register stores the data representing one character for the duration of a single character time and transmits the data on cable 140 during this time.

Detect region start circuit 142 is connected to cable 140 and detects the region start character whenever it appears thereon. As previously explained, this circuit then provides an output on line 150 which resets block counter 151 to zero and is transmitted through OR circuit 152 to turn on block counter flip-flop 156.

As will be explained hereinafter, the functions of block counter 151 and block counter flip-flop 156 are to count the number of blocks detected until the first block having the selected data is detected and no reject signal is transmitted from the CPU. The resultant count remains stored in the block counter and comprises the chain number for the record being read from storage. Thus, when the region start pulse resets block counter 151 to zero and turns on the block counter flip-flop 156, the system is set to begin counting the block start characters as transmitted through AND circuit 157 to the COUNT input of the block counter. As will be explained hereinafter, block counter flip-flop 156 is connected to gate the block start signals until no further reject signals are received, indicating the desired record is being read. Thus, the block counter will contain the number of the block in which the beginning of the desired record is located.

As previously described, detect block start circuit 143 provides an output upon detection of a block start character. This output is transmitted on line 160 to be gated through AND circuit 157, so long as block counter flip-flop 156 is on, to the COUNT input of block counter 151. The negative-going portion of the block start pulse operates status flip-flop 161 and one character single shot 162 to open gate 144 for one character time immediately following each block start character. This gates the status character to detect status full circuit 171 and to detect status empty circuit 172. Switch 136 is in the R position so a status empty character produces no effect and detection of a status full character by circuit 171 produces an output via line 180 and switch 136 to line 190.

Line 190 is connected to, inter alia, the SET OFF input of block counter flip-flop 156 and to one character delay 191.

Since any full block may contain the desired data, the output of detect status full circuit 171, appearing on line 190, is used to turn off block counter flip-flop 156. This prevents further block start pulses from being gated to block counter 151 unless a reject signal is received from the CPU on line 33. The reject signal indicates that the data read was not the desired data; therefore, the reject signal is transmitted by OR circuit 152 to the SET ON input of block counter flip-flop 156 to turn the flip-flop on. This allows the following block start signal to be transmitted to the COUNT input of block counter 151 to designate the data then being transmitted to the CPU over line 31.

The CPU indicates that the data being received over line 31 is the desired data by not transmitting a reject signal on line 33. This leaves block counter flip-flop 156 off, blocking AND circuit 157 from transmitting further block start pulses to block counter 151, thereby preventing further incrementing of the counter. The counter, therefore, contains as its count a number designating the block having the beginning of the desired record contained therein. This number is then the chain number designating the following blocks which contain the remainder of the selected record.

As previously mentioned, line 190 from detect status full circuit 171 is connected to one character delay 191. The one character delay is identical to one character delay 208, previously described, and provides at its output a signal identical to that provided at its input one character time later. The one character delay is connected to the SET ON input of chain number flip-flop 240 and to the R contacts of switch 130.

Chain number flip-flop 240 comprises a conventional flip-flop circuit identical in construction to that of block counter flip-flop 156. The output of the flip-flop is connected to the control input of gate circuit 241. The flip-flop thereby controls the gating of data from single character register 112 via gate circuit 241 and cable 242 to compare block count and chain number circuit 211 to compare chain number and purge register circuit 217 and to gate circuit 243. One character delay 191 is connected via switch 130 and line 214 to the GATE input of block counter 151 and to four character delay 215. The four character delay, previously described, provides an output identical to that received from line 214 on its output four character times later. The output of the four character delay is applied to the SET OFF input to chain number flip-flop 240.

Therefore, a status full pulse is supplied on line 190 by circuit 171 and is delayed one character time by one character delay 191. Upon completion of transmission of the status full character by single character register 112, delay 191 provides an output which simultaneously turns on chain number flip-flop 240 and operates the GATE input of block counter 151. Thus, data from cable 140, comprising the chain number of the block being read, is transmitted through gate 241 due to the operation of chain number flip-flop 240 simultaneously with the transmission of the count of block counter 151 onto cable 210 due to the operation of the stepping means and gating circuits of the block counter. This data is therefore transmitted simultaneously character-by-character to compare block count and chain number circuit 211.

The stepping circuit of block counter 151 automatically transmits the four characters stored therein and then returns to the rest position. Four character delay 215 provides at its output the pulse received from one character delay 191 four character times later. This output turns off chain number flip-flop 240. Therefore, the output of one character delay 191 turns on chain number flip-flop 240 and operates four character delay 215 which turns off the chain number flip-flop four character times later. This allows the gating of data from each detected full block representing only the chain number thereof. Thus, only the four characters comprising the block count and the four characters comprising the chain number are compared a character at a time by compare block count and chain number circuit 211.

Circuit 211 comprises a plurality of logical comparison circuits, each having two inputs connected to corresponding lines and cables 210 and 242. The circuits are arranged such that, upon receipt of data from either cable, the comparison circuits provide an output if the inputs on each of the corresponding lines are identical. The comparison circuits are ANDed together such that all of the comparison circuits must indicate that a comparison is made in order for there to be an output from the AND circuit. The AND circuit is connected to a four stage binary counter having an output at the fourth stage and having a fifth rest stage. If the first set of characters received from block counter 151 and gate 241 correspond, the AND circuit will provide an output and step the binary counter to the first stage from the rest stage. If the three following characters also compare, the AND circuit will provide three pulses to step the counter to the fourth stage, providing an output therefrom. If four comparisons are not made, the binary counter does not reach the fourth stage. Therefore, there is no output.

A gate circuit is connected to the output of the fourth stage. A timing means contained in circuit 211 is connected to the control input of the gate and to the rest stage of the computer. The timing means automatically turns on the gate four character times after the beginning of receipt of data from block counter 151 or gate 241 and also turns off that gate and resets the binary counter to the rest stage five character times after the beginning of receipt of data from block counter 151 or gate 241.

Therefore, if the block count received from circuit 151 is identical to the chain number received from gate 241, circuit 211 produces an output signal immediately after the end of the chain number which lasts for one character time. The binary counter is then automatically turned off and resumes the rest position.

The output of circuit 211 is directed via switch 135, which is in the read position, to OR circuit 220.

OR circuit 220, block length flip-flop 221, block length counter 224 and the circuitry associated therewith have been previously described with respect to the write function. When circuit 211 indicates that the chain number and block count agree, the pulse appearing immediately after the chain number therefrom is transmitted through OR circuit 220 to turn on block length flip-flop 221. This produces an output on line 222, which is transmitted to AND circuit 223. AND circuit 223 responds by gating character clock pulses therethrough to the COUNT input of block length counter 224. Upon reaching the count designating the length of the data area of a block, counter 224 produces an output which is transmitted via OR circuit 225 to turn off block length flip-flop 221. Thus, an output appears on line 222 for the length of the data area of the block in which the block count and chain number have agreed.

Since the block count and chain number agree for each block which is the first block of a record, the complete data for each such block is gated until reject signals are no longer received on line 33. Then, the block count remains locked on the chain number of the desired record so that only those records having the chain number of the desired record will cause circuit 211 to produce a signal thereby activating the block length flip-flop 221.

The output of the block length flip-flop is connected via switch 134, which is in the read position, to the control input of gate circuit 141. This gate controls the transmission of data from single character register 112, via cable 244, to output buffer register 245. Thus, whenever an output is provided by compare circuit 211, the block length circuitry provides a signal on line 222 which opens gate 141 for the length of time required to transmit therethrough all of the data contained in the data area of a block.

Output buffer register 245 is a register for storing characters in parallel and is identical in construction to input buffer register 120. In some configurations it may be desirable to have a readout input to allow the CPU to control the gating of data from the register. However, in the illustrative embodiment, the register stores a block of data as received from single character register 112, stores that data and delivers the data, parallel by bit and serial by character, onto data out cable 31 to the CPU using the timing of the CPU.

The output of gate 141 is also connected through OR circuit 230 to detect end of record circuit 231 which has been previously described. Thus, all of the data in the data area of each block transmitted to output buffer register 245 is also transmitted through OR circuit 230 to circuit 231.

At some point, while the data of a record is being read, an end of record character of that record will appear. This end of record character is detected by detect end of record circuit 231 which responds by providing an output signal on line 182 which is transmitted through OR circuit 225 to turn off block length flip-flop 221. This immediately closes gate 141 without waiting for the block length counter 224 to reach its ultimate count. This thereby terminates the transmission of data upon detection of an end of record character rather than waiting for the end of the data area to appear.

The output line 182 from detect end of record circuit 231 is also connected to the RESET input of block length counter 224 to reset the counter to zero.

The system thus automatically terminates transmission of data after receipt of an end of record character and resets the counter 224 to zero, but does not prevent further operation of the system. This is provided in view of the fact that some records may be less than one block in length and, therefore, the block count and chain number would agree for this record if the desired record had not yet been detected. Thus, even though an end of record character for this block is detected, it remains necessary to search additional blocks to locate the desired record.

It is necessary to end the transmission of data immediately upon receipt of an end of record character because the system provides no means for erasure. Data from previously recorded records not written over by data from the present record could possibly get through and cause erroneous results by the CPU if it were allowed to be transmitted thereto. Therefore, the end of record character is significant in promoting the reliability of the system.

*Read operation*

Referring to FIG. 3B, the example illustrated is the reading of record No. 8 from a selected region.

Referring additionally to FIG. 1, the program 32 of the CPU 10 reaches an instruction commanding that a record from a selected region of cyclic file 12 having specific identifying data be read. To accomplish this, the CPU selects the desired region by appropriate signals on track select line 28, which is interpreted by file control unit 11 to select, via control line 29, the desired track. The CPU then transmits a signal on command read line 43. The CPU may then go about other business while standing by to compare data appearing on data out cable 31 with the specified designating data.

Referring additionally to FIG. 4, the signal on line 43 operates the switching means to throw switches 130–137 to the R or "Read" position. Then, nothing of importance happens until the region start character is read by read head 101 and read amplifier 105 and deserialized by deserializer 110. Upon completion of deserialization, at the end of the character time, the parallel data is transmitted to single character register 112. The register stores the data for one character time during which it transmits the data on cable 140. The region start character is detected by detect region start circuit 142, which thereby transmits the signal on line 150 for the duration of the character time that the character is received from single character register 112.

This signal on line 150 resets block counter 151 to zero and is transmitted by OR circuit 152 to turn on block counter flip-flop 156. The output of the block counter flip-flop provides one input to AND circuit 157 so that the subsequent block start signal will be gated to the COUNT input of block counter 151. Thus, the system is reset and in condition for reading the data from the first block of each record to the CPU so long as reject signals are received on line 33.

The first block to be detected is block No. 1, which has record No. 1 stored therein. The block start character for block No. 1 is read, deserialized and stored in single character register 112 for the subsequent character time. This character is detected by detect block start circuit 143 and an output signal transmitted therefrom on line 160. The positive-going portion of the output is gated by AND circuit 157, as previously stated, to the COUNT input of block counter 151. This increments the counter by one so that the first stage of the lowest order counter is then activated. This provides a coded signal representative of No. 1 to the internal gate circuits.

At the conclusion of the block start signal on line 160, the negative-going portion of the signal turns on status flip-flop 161 and operates one character single shot 162. The output of status flip-flop 161 operates gate 144 to transmit therethrough the immediately following character, which is the status character. One character time later, single shot 162 turns off status flip-flop 161 and blocks gate 144.

The status character is transmitted by single character register 112 through gate 144 to detect status full circuit 171 and to detect status empty circuit 172. Since, as shown in FIG. 3B, record No. 1 is stored in block No. 1, detect status full circuit 171 provides an output while detect status empty circuit 172 does not. Thus, since switch 136 is in the read position, the output of circuit 171 appears on line 190 to turn off block counter flip-flop 156 and to operate one character delay 191. Turning off block counter flip-flop 156 prevents AND circuit 157 from transmitting further block start pulses to block counter 151 while the block counter flip-flop remains off. This prevents further incrementing of the counter so that it contains as its count a number 1 which designates block No. 1 which has the beginning of record No. 1 contained therein. If record No. 1 is the desired record, the count contained in the counter will be utilized to designate the chain number for additional blocks containing that record.

Immediately after the transmission of the block start character from single character register 112, one character delay 191 provides an output to turn on chain number flip-flop 240, to operate, via switch 130, the GATE input of block counter 151, and to operate four character delay 215. When turned on, chain number flip-flop 240 operates gate 241 to gate therethrough data appearing at the output cable 140 of single character register 112. This data comprises the chain number of block No. 1, which is thereby gated on line 232 to one input of compare block count and chain number circuit 211. Simultaneously, the output of one character delay 191 operates the stepping circuit and internal gates of block counter 151 to transmit, via cable 210, the count stored therein to the other input of compare circuit 211. After the complete chain number has been transmitted on line 232 to the compare circuit, four character delay 215 provides an output on line 216 to turn off chain number flip-flop 240. This terminates further transmission through gate 241.

As shown in FIG. 3B, the block No. "1" and the chain No. "1" are the same. Thus, a comparison is made by compare circuit 211 and an output provided for one character time immediately after the comparison. This output is transmitted through switch 135 and OR circuit 220 to turn on block length flip flop 221. The flip-flop provides an output on line 222 which operates gate 223 to gate character clock pulses to block length counter 224. The counter counts the character pulses until sufficient pulses have been counted to indicate the end of a data area. The counter then provdes an output which is transmitted through OR circuit 225 to turn off block length flip-flop 221. This terminates the output pulse on line 222.

Line 222 is connected through switch 134 to gate circuit 141. The pulse on line 222 appears for the duration of the data area of block No. 1 and gate 141 responds by gating the data from single character register 112 to cable 244. Cable 244 is connected to output buffer register 245 and transmits the data thereto, which in turn retransmits the data on data out cable 40 to the CPU at CPU timing.

The CPU detects this data and, since record No. 8 is desired, the program 32 rejects the data from record No. 1 by providing a reject signal on line 33. This signal is transmitted by OR circuit 152 to turn on block counter flip-flop 156, which operates AND circuit 157 to gate the subsequent block start character.

The block start character for block No. 2 is then detected by circuit 143 and gated by AND circuit 157 to block counter 151. This increments the block counter so that it now contains the number "2." The negative-going portion of the block start signal turns on status flip-flop 161 and operates one character single shot 162 to gate the status character through gate 144.

Again, block No. 2 is full so circuit 171 provides an output on line 190 which turns off block counter flip-flop 156, blocking AND circuit 157 and which operates one character delay 191.

One character time later, delay 191 turns on chain number flip-flop 240 operating gate 241 and is transmitted via switch 130 to operate the GATE input of block counter 151. Thus, the chain number of block No. 2 is transmitted through gate 241 simultaneously with the transmission of the count from block counter 151 to compare circuit 211.

In this case, counter 151 provides the number "2" and the chain number provided through gate 241 is the number "1," so no comparison is made. Thus, circuit 211 does not provide an output and the block length circuitry is not operated thereby blocking gate 141 from transmitting data therethrough. At the end of the chain number, four character delay 215 turns off chain number flip-flop 240 thereby blocking gate 241. Since no data is received by the CPU, it again transmits a signal on reject line 33, turning on the block counter flip-flop 156.

Block No. 3 is treated similarly, incrementing the block counter 151 to the number "3" and preventing the transmission of data. Again, the CPU sends a reject signal on line 33 turning on flip-flop 156.

Referring to block No. 4, the block start character is detected by circuit 143 and the block start signal is counted by block counter 151 thereby providing the number "4." The negative-going portion of the block start signal operates the status flip-flop 161 and single shot 162 to operate gate 144 during the status character time. The status character is then gated therethrough and, since the block is full, detect status full circuit 171 provides an output on line 190. This output turns off block counter flip-flop 156 and operates one character delay 191. Again, the delay operates block counter 151 and chain number flip-flop 240 to gate the chain number and block count to comparison circuit 211. Now, the block number is number "4" and the chain number is also number "4," so the compare circuit 211 provides an output which turns on block length flip-flop 221. The block length circuitry then operates to open gate 141 for the time comprising the data area of block No. 4, thereby gating the data of block No. 4 to output buffer register 245. The buffer register retransmits the data to the CPU on cable 31 and the program 32 of the CPU detects that the selection requirements are satisfied thereby.

Thus, the CPU does not transmit a reject signal on line 33. Block counter flip-flop 156, therefore, remains off and prevents any further block start characters from reaching block counter 151 through AND circuit 157. The block counter, therefore, is locked on the number "4" which is the chain number of the desired record.

Next, the block start character for block No. 5 is detected by circuit 143. The resultant signal on line 160 is blocked by AND circuit 157 since block counter flip-flop 156 is off. Thus, block counter 151 remains locked at the number "4."

The negative-going portion of the block start signal operates status flip-flop 161 and one character single shot 162 to open gate 144 for the status character. The status character, again indicating full, causes circuit 171 to produce an output on line 190. This output has no effect on the block counter flip-flop 156, but operates one character delay 191. At the end of the status character, delay 191 operates the chain number flip-flop 240 and block counter 151 so that the chain number of block No. 5 is gated through gate 241 to compare circuit 211 and block counter 151 transmits the stored number "4" to the compare circuit. Again, the chain number and output of block counter 151 are identical, so circuit 211 turns on the block length circuitry. The block length circuitry operates gate 141 to allow all of the data of block No. 5 to be transmitted to output buffer register 245, which retransmits the data to the CPU.

The block start character for block No. 6 has no effect on block counter 151. The signal also operates the status flip-flop 161 and associated circuitry to open gate 144 and allow the status character therethrough. Again, since block No. 6 is indicated as being full, circuit 171 provides an output on line 190 which has no effect on block counter flip-flop 156, but which operates one character delay 191. Again, the delay operates chain number flip-flop 240, the GATE input to block counter 151 and four character delay 215 to gate the number "4" representing the block count from counter 151 and simultaneously gating the chain number "6" from the single character register 112 to compare circuit 211. Since the numbers are different, no comparison is made and the block length circuitry is not operated, preventing the transmission of data to the CPU.

Blocks 7–21 are all full, but all have chain numbers different than the number "4" contained in block counter 151. Therefore, compare circuit 211 never makes a comparison and no data is transmitted to the CPU.

Upon reaching block No. 22, the positive-going portion of the output of circuit 143 has no effect since AND circuit 157 remains blocked by clock counter flip-flop 156. The negative-going portion of the signal operates the status flip-flop 161 to open gate 144 which is closed one character time later by the operation of single shot 162. The status character gated therethrough indicates the block is full and causes circuit 171 to provide an output. The output is directed over line 190 to operate one character delay 191. The output has no effect on block counter flip-flop 156, since it is already off.

The output of delay 191 again operates block counter 151 and, via chain number flip-flop 240, operates gate 241 to transmit the chain number "4" from single character register 140 and the block count number "4" from counter 151 to compare circuit 211. A comparison is made and the output therefrom operates the block length circuitry to open gate 141 to allow the transmission of data from block No. 8 therethrough. The data is received and retransmitted by output buffer register 245 to CPU 10.

Block No. 23 is similarly treated in that the chain number agrees with the block count so comparison circuit 211 provides an output to turn on block length flip-flop 221. This again gates character clock pulses through AND circuit 223 to block length counter 224 and also opens gate 141 to transmit data from single character register 112 to output buffer register 245.

However, an end of record character is contained in the data area of block No. 23 and is transmitted by single character register 112 before block length counter 224 reaches its ultimate count. Therefore, the end of record character, as transmitted on cable 244, is detected by detect end of record circuit 231. The circuit then provides an output on line 182 which is transmitted through OR circuit 225 to turn off block length flip-flop 221 and which resets the block length counter to zero. When turned off, the block length flip-flop removes the gating signal from gate 141 thereby preventing further transmission of data therethrough. In this manner, no data beyond the end of record character is transmitted to the output buffer register. Thus, after the desired record has been selected, the system transmits to the CPU only that data comprising the data of record No. 8 including the end of record character. No remaining unerased data of block No. 23 is transmitted. The reliability of this system is thus assured.

*Purge circuitry*

As described with respect to FIGS. 1–3, the CPU enters the purge mode by transmitting signals on command purge line 34 and command read line 43. Thus, the purging function utilizes the reading function to read the first block of each record until the selected block is detected. When the program 32 detects the selected record, no reject signal is transmitted on line 33 in accordance with the read function, and, in addition, a command purge signal of two character length duration is then transmitted on line 34. This causes the system to store the chain number of the selected block and to alter the status character of that block from "full" to "empty." The additional blocks storing the selected record have the same chain number as the selected block. These records are then automatically purged by the system by means of altering the status character. The purging is ceased by detection of an end of record symbol within the data area of one of the blocks being purged.

A feature of the present system is that the record being purged will also automatically be read out on line 31 to the CPU, thereby allowing both reading and purging on a single pass of the cyclic file 12.

Referring additionally to FIG. 4, the CPU places the system in the purge mode by transmitting a command read signal on line 43 and a command purge signal on line 34. The signal on line 43 throws switches 130–137 to the R position. The read circuitry therefore operates identically as in the read mode, as described above.

The signal on line 34 operates a relay (not shown) which throws switches 251 and 192 to the P, or "Purge" position. The system is now set to read data to the CPU until the CPU designates the selected record by transmitting a command purge signal on line 34 of two character lengths duration. The requirement of the two character length signal is a safety feature to prevent accidental purging of the cyclic file.

The command purge line 34 is connected not only to the above mentioned relay, but also to the SET OFF input to purge blocking flip-flop 153. The purge blocking flip-flop comprises a conventional flip-flop circuit having an integrating circuit at its SET OFF input. The integrating circuit prevents the turning off of the flip-flop until the input signal on command purge line 34 remains on for two character times. Then, the output of the integrating circuit builds up to a sufficient voltage to operate the flip-flop, turning it off.

The SET ON input to the purge blocking flip-flop is connected to the output of detect region start circuit 142. Thus, the flip-flop is reset to its normally on state at the beginning of each region by the output of detect region start circuit 142. The flip-flop then remains on until turned off by the special two character length command purge signal which is transmitted by the CPU at the moment it recognizes the data designating the record it desires to purge.

The function of the purge blocking flip-flop 153 is to control the entire purging operation so that no purging may be accomplished until the special signal is received on command purge line 34. The output of the purge blocking flip-flop is connected to the control input to gate 243 and to inverter 252.

The controlled input to gate circuit 243 is connected, via switch 132 and gate circuit 241, to the output of single character register 112. Gate circuit 241 is controlled by previously described circuitry including chain number flip-flop 240 and four character delay 215 to gate therethrough only the chain number of every block having a full status character. Before the two character command purge signal is received, the purge blocking flip-flop is on opening the gate circuit 243. This allows the chain number of every full record, as transmitted by gate 241 of the read circuitry, to be gated through gate 243 to purge register 155.

The purge register comprises a conventional storage register which is momentarily reset to zero by an incoming signal which then assumes the code of the number received at its input. The purge register continually applies at its output the code representative of the number stored therein. Thus, the purge register is continually updated to store the most recently received chain number until the command purge signal closes gate 243. Since a two character command purge signal is received only during the transmission to the CPU of the data from the first block of the record the CPU desires to purge, the purge register contains, after the special command purge signal, the chain number of the record to be purged.

The RESET input of purge register 155 is connected to the output of detect region start circuit 142. Thus, as the region start character is detected by circuit 143, the output therefrom on line 150 resets the purge register to zero. Therefore, the chain number cannot be stored after the first pass of the memory. This serves as another safety feature to prevent accidental purging.

Purge register 155 is connected to compare chain number and purge register circuit 217. This circuit is essentially identical in construction to compare block count and chain number circuit 211, previously described, except that the timing means therein leaves the output of the circuit on for the length of time equal to that required for the data area of a block to pass one head of the file. Thus, upon detecting an identical comparison between the chain number and purge register, compare circuit 217 provides a signal on its output of duration equal to the data area of a block.

Since the chain number for every full record is transmitted through gate 241 to one input of compare circuit 217 and also transmitted via gate 243 and purge register 155 to the other gate of compare circuit 217, the circuit provides an output of one data area time immediately after the detection of the chain number of every full block until the special command purge signal is received. Upon receipt of the special command purge signal, purge blocking flip-flop 153 turns off, thereby closing gate 243 and preventing further transmission of chain numbers to purge register 155. From that time forward, the purge register 155 transmits to compare circuit 217 the chain number of the record selected by the CPU to be purged. Gate 241 continues to transmit the chain number for every full record to the other input of compare circuit 217. Therefore, circuit 217 provides an output each time the chain number of a full block is that of the record to be purged.

The output of purge blocking flip-flop 153 is connected, in addition to gate 243, to inverter 252. The inverter generates at its output a D.C. voltage level opposite to that of the level on its input. Therefore, when purge blocking flip-flop 153 is on, the inverter provides no signal on its output and when the purge blocking flip-flop 153 is off, the inverter provides a positive level at its output. The output of inverter 252 is connected to one input to AND circuit 253. The other input to the AND circuit is connected to the output of compare circuit 217.

Since purge blocking flip-flop 153 is normally on, the output of inverter 252 is normally off thereby closing AND circuit 253 so as to block the output of compare circuit 217. Only after the special command purge signal is received on line 34 does the flip-flop 153 switch off so that the inverter provides a positive signal to one side of the AND circuit, gating the output of compare circuit 217 therethrough.

The CPU reads a portion of the data transmitted by the read circuitry thereto before detecting that the data being read is that of the record to be purged. Thus, the signal on line 33 is not transmitted until long after the chain number has been detected. Therefore, the reason that compare circuit 217 is provided with an output of long duration is so that the command purge signal will cause the output therefrom to be gated by AND circuit 253 regardless of what time during the reading of data from a block that the CPU transmits the special command purge signal.

The output of AND circuit 253 is connected, via switch 251, to set status empty circuit 254. The set status empty circuit is substantially identical to set status full circuit 200 except that its output produces the code representing the status empty character. This character is transmitted on cable 255 through OR circuit 203 to single character register 204. The single character register stores the status empty character until such time as a signal appears on command readout line 205.

Since the CPU will provide the special command purge signal toward the end of the data area of the first block of the record to be purged, it is necessary to operate the timing circuitry for proper gating of the status character before the command purge signal is received. Therefore, the output of detect status full circuit 171 which controls the timing is connected via switch 136, line 190, switch 192, and OR circuit 201 directly to head delay and single shot circuit 207.

In this manner, the head delay is initiated upon detection of every status full character so that the command readout line is energized to transmit whatever is stored therein to serializer 111 to be written in the status area thereof. If during this period no command purge signal is received, no output is transmitted from set status empty circuit 254. Therefore, there is no data contained in the single character register and nothing is transmitted therefrom as a result of the command readout signal. However, if a command purge signal has been received so that AND circuit 253 operates to transmit the output of compare circuit 217 therethrough, set status empty circuit 254 provides the status empty character to single character register 204. The delayed command readout signal from head delay and single shot circuit 207 then operates to cause the register to transmit the character on cable 206. This character is transmitted via OR circuit 122 to serializer 111 which causes write amplifier 106 to write the status empty character into the status area of the selected block. This effects the purging of the block.

The output of inverter 252 remains on for the rest of the region since purge blocking flip-flop 153 remains off thereby gating subsequent outputs of compare circuit 217 therethrough. These outputs indicate those blocks having a chain number of the record to be purged and again allows operation of set status empty circuit 254. The status empty characters are again transmitted by single character register 204 to be written in the status area of those blocks.

In the event no comparison is made by compare circuit 217, nothing is transmitted through the AND gate 253 so no status empty characters are written in the status areas of those blocks.

As the pass of the region is completed, the region start character is detected by circuit 142 and the output on line 150 therefrom resets purge register 155 to zero and resets purge blocking flip-flop 153 to its normally on state. This again opens gate 243 to allow the gating of subsequent chain numbers to purge register 155 and turns off inverter 252 to block AND gate 253. Therefore, no further transmissions are allowed to set status empty circuit 254 even though switch 251 remains closed.

This is another safety factor preventing accidental purging of the cyclic file.

*Purge operation*

Referring to FIG. 3C, the example illustrated is the purging of record No. 9 from a selected region.

Referring additionally to FIG. 1, the program 32 of the CPU 10 reaches an instruction commanding that a record from a selected region of cyclic file 12 having specific identifying data be purged therefrom. To accomplish this, the CPU selects the desired region by appropriate signals on track select line 28, which is interpreted by file control unit 11, to select, via control line 29, the desired track. The CPU then transmits a signal on command read line 43 and a signal on command purge line 34.

Referring additionally to FIG. 4, the signal on line 43 operates a switching means to throw switches 130-137 to the R position so that the system assumes the read mode. The signal on line 34 operates another switching means (not shown) to throw switches 251 and 192 to the P or "Purge" position. This sets the system to the purge mode in addition to the read mode.

The operation of the read portion of the system is identical to that described with respect to the read operation described above. Therefore, the operation of the read circuitry will not be described except in cursory fashion.

After the switches have been thrown, nothing of importance happens until the region start character is read by read head 101 and read amplifier 105 and deserialized by deserializer 110. Upon completion of the deserialization, at the end of the character time, the parallel data is transmitted to single character register 112. The register stores the data for one character time during which it transmits the data on cable 140. The region start character on cable 140 is detected by region circuit 142 which transmits a signal on line 150.

This signal resets the read circuitry and also resets purge register 155 to zero and is received at the SET ON input to purge blocking flip-flop 153. This turns on the flip-flop if it was not already on. The output of the flip-flop is applied to the control input to gate 243 turning the gate on so that it transmits data received at the controlled inputs therethrough. The output of the flip-flop is also applied to inverter 252 which inverts the signal and thereby turns off AND circuit 253 preventing the transmission of signals therethrough.

The first block to be detected is block No. 1, which has record No. 9 stored therein. Record No. 9 is the block to be purged. The block start character for block No. 1 is detected by detect block start circuit 143 and the output therefrom operates the various read circuitry and is counted by block counter 151. The status character of block No. 1 is detected by detect status full circuit 171 since the block is full and an output transmitted on line 190. This output is transmitted via switch 192 and OR circuit 201 to begin operation of head delay and single shot circuit 207. The status character also operates various read circuitry to gate the chain number immediately following through gate circuit 241. Therefore, the chain number, which is the number "1," is gated through gate 241 to one input of compare chain number and purge register 217 and to the control input of gate circuit 243. As previously explained, gate circuit 243 is open so that the data is transmitted to purge register 155. The purge register stores the data therein and transmits the number to the other input of compare circuit 217.

Since the chain number and the output of the purge register 155 are identical, compare circuit 217 then provides an output signal equal to the data area of block No. 1 to one input of AND circuit 253. However, the AND circuit remains off blocking the transmission of the signals therethrough.

Then, the read circuitry causes the transmission of the data from the data area of block No. 1 to the CPU on cable 31. The program 32 of the CPU subsequently detects that the data being read is that designating the record to be purged. Therefore, the CPU does not transmit a reject signal on line 33 and does transmit a special two-character purge signal on line 34.

The special command purge signal is detected by the integrating circuit at the SET OFF input of purge blocking flip-flop 153, turning the flip-flop off. This closes gate 243 and causes inverter 252 to provide a positive output. This output operates AND circuit 253 to gate the output of compare circuit 217 therethrough. This output is transmitted, via switch 251, to set status empty circuit 254.

The set status empty circuit then responds by transmitting the status empty character via line 255 and OR circuit 203 to single character register 204. The single character register then stores the status empty character.

As the status character position of record No. 1 comes adjacent to write head 102, head delay and single shot circuit 207 provides a signal on command readout line 205 commanding the single character register to transmit the status empty character onto cable 206. The status empty character is then serialized by serializer 111 and written by write amplifier 106 and write head 102 into the status character position of block No. 1.

Therefore, the status full character of block No. 1 has operated head delay and single shot 207, the chain number of block No. 1 has been stored in purge register 155, and the data therefrom transmitted to the CPU. The CPU has indicated that that data designates the record to be purged and responded by transmitting a special command purge signal on line 34. This signal has gated the output of compare circuit 217 to set the status empty character into the status position of the record as controlled by the timing of head delay and single shot 207.

Block No. 2 is then detected by read head 101. The block start character thereof causes operation of the status circuitry to gate the subsequent status character to circuits 171 and 172. Detect status full circuit 171 provides an output on line 190 which initiates operation of head delay and single shot 207. The output also operates one character delay 191 to subsequently operate the chain number circuitry to gate the chain number to gate 243 and to one input of compare chain number and purge register 217.

Purge blocking flip-flop 153 is off due to the special command purge signal received during the previous block. Therefore, gate 243 blocks the transmission of the chain number to purge register 155. The output of purge register 155 to the other input of compare circuit 217 is therefore the previous chain number, number "1."

The chain number of block No. 2, however, is also the number "1." Therefore, the compare circuit provides an output to AND circuit 253 of duration equivalent to that of one data area.

Also as a result of purge blocking flip-flop 153 being off, inverter 252 provides a positive signal to the other input of AND circuit 253. Therefore, the output of compare circuit 217 is gated therethrough to thereby operate set status empty circuit 254. Circuit 254 then transmits the status empty character to single character register 204 which stores the character until the status area of record No. 2 is adjacent write head 102 at which time head delay and single shot circuit 207 provides a signal on command readout line 205 causing the register to transmit the status empty character to serializer 111. Serializer 111 then provides a serial translation of the character to write amplifier 106, which causes the character to be written into record No. 2.

Thus, since a chain number of record No. 2 was the same as that stored in purge register 155, the output of compare circuit 217 causes the status empty character to be written into the status position of the record as controlled by the timing of head delay and single shot 207.

Likewise, record No. 3 also contains as its chain number, the number "1,". Therefore, compare circuit 217 again provides an output which is gated to set status empty circuit 254. Again, circuit 254 causes the status empty character to be written into the status position of record No. 2, as controlled by the timing of head delay and single shot 207.

Block No. 4 is also full and the resultant output of detect status full circuit 171 gates the chain number thereof to compare circuit 211 for comparison with the output of purge register 155. Here, the chain number is the number "4" while the output of purge register 155 is the number "1." Thus, compare circuit 217 does not provide an output and the command readout signal from head delay and single shot 207 operates single character register 204, but gates nothing therefrom since set status empty circuit 254 was not actuated.

Likewise, blocks 5–23 are all indicated as being full, but the chain number does not agree with the chain number "1" of record No. 9. Therefore, no status empty characters are transmitted.

The status full character from block No. 24 operates head delay and single shot 207 and operates the chain number circuitry to gate the chain number thereof to compare circuit 217. As shown, the chain number of block No. 24 is the number "1," which agrees with the output of the purge register. Therefore, the compare circuit transmits an output through AND circuit 253 to operate set status empty circuit 254. The resultant status empty character is transmitted by single character register 204 and the time controlled by head delay and single shot 207 to serializer 111. The character is then serialized and written into the status area of block No. 24.

At some point during the reading of data from block No. 24, an end of record character is transmitted through gate 141 onto cable 244. The character is detected by detect end of record circuit 231 and an output provided on line 182. This output turns off the block length circuitry to terminate the transmission of data to the CPU.

As shown, all subsequent blocks in the region are indicated as being empty. Therefore, detect status full circuit 171 provides no output onto line 190 and the outputs of detect status empty circuit 172 are prevented by AND circuit 158 and switch 136 from transmitting a signal onto line 190. Therefore, no further chain numbers are gated to compare circuit 217 and no further purge outputs are provided therefrom.

Upon the completion of the complete scan of the region, the region start character is detected by circuit 142 and the resultant output on line 150 resets purge blocking flip-flop 153 to its normal on state. Additionally the output resets purge register 155 to zero. The turning on of purge blocking flip-flop 153 turns off inverter 252 to block any outputs from compare circuit 217 thereby preventing further purge signals therefrom until such time as a special command purge signal is received on line 34 from the CPU.

Therefore, the described system has read to the CPU the data of block No. 1, the CPU detected that the data was that of the block to be purged and thereby supplied the special purge signal to file control unit 11. This signal caused the system to change the status character in block No. 1 from "full" to "empty," and to store the chain number "1" of the record No. 9 in purge register 155. The system then similarly changes the status character of all blocks having the claim number "1" from "full" to "empty" and skipped all those records not having the chain number "1" of record No. 9. Finally, the end of record character in block No. 24 ended the transmission of data to the CPU and the subsequently detected region start character reset system.

*Additional systems*

The arrangement of the system described above is dependent not only on the above described method, but also upon the specific format used for the blocks. Thus, the system has been shown designed in a certain way to utilize the control characters designating the region start and block start and to utilize the strict format that the chain number always comprises four characters and that the data area of a block always comprises the same number of characters designated by block length counter 224. The system is also dependent upon the fact that the block itself is always organized as shown in FIG. 2 in that the status character 23 always follows the start character 22, the chain number 24 always follows the status character, and the data area 25 always follows the chain number.

Therefore, by changing the format for the blocks of data, and/or by deleting or adding other control characters, the system for accomplishing the described method must according be altered.

One example of such a change is the addition of the control character, "chain number follows." The use of such a character allows the placing of the chain number for the first block of each record at the end of the block, immediately preceded by the character "chain number follows."

Such a character has the advantage of allowing the CPU to read all of the data in the data area of a block and then utilize the chain number time to decide whether the desired record was being detected. Subsequent blocks containing the same record would then have the chain number located immediately after the status character, as described in the above system.

The system then must be changed to operate on the chain number as a result of detecting the chain number follows character rather than depending upon the chain number immediately following the status character, as above.

Another example of such a change is the addition of the control character "data follows." This character keys the system to expect data immediately thereafter rather than to depend upon delay or clocking circuits to gate the output of the reading means a predetermined time after the beginning of a block.

If the data follows a chain number, it allows the use of chain numbers of variable length since it automatically signals the end of the chain number and the beginning of data.

While the invention has been particularly shown and described with respect to preferred embodiments thereof, it will be understood by those skilled in the art that various changes in form and details may be made therein without departing from the spirit and scope of the invention.

What is claimed is:

1. A method of organizing a cyclical file comprising the steps of:

dividing said cyclical file into a plurality of regions;
further dividing each of said regions into a plurality of blocks;
initially storing records sequentially beginning in the first block of a desired one of said regions;
purging selected records from said region of said cyclical file by effectively erasing each one of said blocks wherein a record to be purged is located; and
storing additional records in said region of said cyclical file beginning in the first available block in said region and sequentially thereafter in subsequent available blocks of said region as needed, whereby the stored data is packed toward the front of said region.

2. The method of claim 1 wherein:

said initial storing and said storing of additional records additionally includes the recording of a special character within each one of said blocks in which said records are stored, said special character indicating that said blocks are full;
said effective erasure comprises the erasure of said special character within each one of said blocks so erased; and
said detection of said available blocks comprises the detection of the absence of said special character within a block.

3. The method of claim 1 wherein:

said step of dividing each of said regions into a plurality of blocks additionally includes the step of recording of a special character which indicates that the block is empty;
said initial storing of records additionally includes the erasure of said special character in those blocks in which data is stored;

said effective erasure of each one of said blocks to be purged comprises the recording of said special character in each of said blocks;

the detection of said available blocks comprises the detection of said special character therein; and said recording of additional records comprises additionally the erasure of said special character appearing in those blocks in which said additional records are recorded.

4. The method of claim 1 further including the step of: reading selected records from said cyclical file.

5. The method of claim 4 wherein said reading step includes the steps of:

reading data from each record stored in said region of the file until data designating a selected record is detected; and subsequently reading all subsequent blocks containing data of the same record.

6. A method of organizing a cyclical file comprising the steps of:

dividing said cyclical file into a plurality of regions;

further dividing each of said regions into a plurality of blocks;

initially storing records sequentially beginning in the first block of a desired one of said regions;

designating each block storing a common record by recording a common chain character therein, each common chain character being different for each record;

purging selected records from said regions of said cyclical file by effectively erasing each one of said blocks wherein a record to be purged is located, as designated by said common chain character recorded therein;

storing additional records in said region of said cyclical file beginning in the first available block in said region and sequentially thereafter in subsequent available blocks of said region as needed, whereby the stored data is packed toward the front of said region; and designating each block storing a common one of said additional records by recording a common chain character therein, whereby all of the blocks storing a common record are designated by a common chain character.

7. The method of claim 6 wherein:

each said common chain character designating a particular record comprises the sequential number within said region of the block wherein the first portion of data from said record is stored.

8. The method of claim 6 wherein said purging step includes the steps of:

reading data from each record stored in said region of said cyclical file as said records are detected until data from a selected record is detected;

detecting the chain character of the block from which said data was read; and purging said selected record from said region by effectively erasing each of said blocks wherein said detected chain character is located.

9. The method of claim 8 wherein:

said reading step comprises reading data from the first block of each record stored in said region as encountered until data from a selected record is detected.

10. The method of claim 9 wherein:

said first block of each record is designated by being the first block having a chain character not previously detected during the present pass of said region.

11. The method of claim 9 wherein:

each said chain character designating a particular record comprises the sequential number within said region of the block wherein the first portion of data from said record is stored, whereby, in said reading step, said first block of each record stored in said region is indicated by its having a chain number identical to the sequential number of the block within said region.

12. A method of organizing a cyclical file comprising the steps of:

dividing said cyclical file into a plurality of regions;

further dividing each of said regions into a plurality of blocks;

writing a first special character in each one of said blocks to indicate that said blocks are empty;

initially storing records sequentially beginning in the first block of a desired one of said regions;

erasing said first special character in each one of said blocks in which said records are stored;

recording a second special character in each of said blocks in which said records are stored to indicate that said blocks are full;

purging selected records from said region of said cyclical file by erasing said second special character and recording said first special character in each one of said blocks wherein a record to be purged is located;

storing additional records in said region of said cyclical file beginning in the first available block in said region by detecting the first block in said region having said first special character therein and sequentially thereafter in subsequent available blocks of said region as needed, said available blocks being detected by the detection of said first special character therein; and erasing said first special character and recording said second special character in each of said blocks wherein said additional records are stored.

13. A data storage system for storing data records, each said record terminating with a special character, comprising:

a cyclical data storage means divided into a plurality of regions of selected lengths, each region being divided into a plurality of blocks;

reading means for reading stored data in said data storage means;

writing means for subsequently storing data in said data storage means;

region detection means for detecting the beginning of a selected region;

status detection means responsive to said reading means for detecting whether a block is empty; and gating means responsive to said region detection means, said status detection means, and said special character for gating a data record to said writing means for the duration of the first said detected empty block subsequent to said detection of the beginning of said selected region, and for the duration of each following detected empty block until terminated by the gating of said special character.

14. The apparatus of claim 13 for storing data records further including:

means for designating the ones of said blocks containing each particular one of said data records.

15. The apparatus of claim 13 further including:

purging means for effectively emptying selected ones of said blocks.

16. A data storage system for storing data records, each said record terminating with a special character, comprising:

a cyclical data storage means divided into a plurality of regions of selected lengths, each region being divided into a plurality of blocks of equal length;

reading means for reading data recorded on said data storage medium;

writing means for subsequently recording data on said data storage medium;

region detection means for detecting the beginning of a selected region;

status detection means responsive to said reading means for detecting whether a block is empty;

ter immediately following said block start character indicating that said block is empty;

reading means mounted for reading recorded data on said data storage medium;

writing means mounted behind said reading means for subsequently recording data on said data storage medium;

region detection means for detecting said region start character and resetting and rendering said system effective upon making such detection;

gateable buffer means for temporarily storing said data records to be written, the output thereof being connected to said writing means;

block detection means responsive to said reading means and activated by said block start character for detecting said first status character, thereby detecting whether such block is empty;

block indication means responsive to the operation of said block detection means and operated by said block start character for erasing said first status character of said first and each subsequently detected empty block and recording therefor a second status character indicating that each said block is full, for storing a chain character representative of the first detected empty block for operating said writing means to write a special keying character immediately followed by said chain character in said first and each subsequently detected empty block;

gate operation means responsive to the operation of said block detection means for gating said gateable buffer means to thereby supply said stored data to said writing means for writing said stored data in said first and each subsequently detected empty block;

purge selection means responsive to said reading means for detecting a selected record to be purged;

chain detection means responsive to said purge selection means and said reading means and operated by said keying character for detecting and storing the chain character of the block from which the said selected record was detected;

erasing means responsive to said chain detection means and operated by said block start character for erasing said second status character in each of said blocks wherein said stored chain character is detected and for writing said first status character therefor in each of said blocks; and termination means for detecting the end of said data record being written to terminate the operation of said block indication means and said gate operation means.

References Cited

UNITED STATES PATENTS

| | | | |
|---|---|---|---|
| 3,154,771 | 10/1964 | David et al. | 340—174.1 |
| 3,085,230 | 4/1963 | Shoultes et al. | 340—174.1 |
| 2,916,210 | 12/1959 | Selmer | 340—172.5 |
| 2,863,137 | 12/1958 | Cox et al. | 340—174.1 |

BERNARD KONICK, *Primary Examiner.*

A. I. NEUSTADT, *Assistant Examiner.*